US008878869B2

(12) United States Patent
Inada et al.

(10) Patent No.: US 8,878,869 B2
(45) Date of Patent: Nov. 4, 2014

(54) IMAGE PROCESSING DEVICE AND IMAGE PROCESSING METHOD

(75) Inventors: Tetsugo Inada, Kanagawa (JP); Akio Ohba, Kanagawa (JP); Hiroyuki Segawa, Kanagawa (JP)

(73) Assignees: Sony Corporation, Tokyo (JP); Sony Computer Entertainment Inc., Tokyo (JP)

( * ) Notice: Subject to any disclaimer, the term of this patent is extended or adjusted under 35 U.S.C. 154(b) by 227 days.

(21) Appl. No.: 13/120,785

(22) PCT Filed: Jun. 30, 2009

(86) PCT No.: PCT/JP2009/003043
§ 371 (c)(1),
(2), (4) Date: May 27, 2011

(87) PCT Pub. No.: WO2010/038337
PCT Pub. Date: Apr. 8, 2010

(65) Prior Publication Data
US 2011/0221780 A1 Sep. 15, 2011

(30) Foreign Application Priority Data
Sep. 30, 2008 (JP) ................................ 2008-255563
Sep. 30, 2008 (JP) ................................ 2008-255655

(51) Int. Cl.
*G06T 11/60* (2006.01)
*G09G 5/39* (2006.01)
(Continued)

(52) U.S. Cl.
CPC .. *G09G 5/36* (2013.01); *G09G 5/39* (2013.01); *G09G 2360/121* (2013.01); *G09G 5/363*
(Continued)

(58) Field of Classification Search
CPC ......... G06T 11/60; G06T 11/00; G06T 9/008; H04L 27/0006; H04L 27/06; G06K 9/2063; G06K 15/00; G06K 2215/0002; G06K 2215/0082; H04N 19/00496; H04N 19/00769; H04N 19/00484; H04N 7/50; H04N 7/26244; G09G 2340/02; G09G 2340/0407
USPC .......................................... 345/619; 382/284
See application file for complete search history.

(56) References Cited

U.S. PATENT DOCUMENTS 6,563,999 B1 5/2003 Suzuoki
7,187,781 B2 * 3/2007 Hayashi ....................... 382/100
(Continued)

FOREIGN PATENT DOCUMENTS

CN 1198566 A 11/1998
EP 0971544 A2 1/2000
(Continued)

OTHER PUBLICATIONS

Office Action for corresponding Korean Patent Application No. 10-2011-7009478, Jul. 25, 2012.
(Continued)

*Primary Examiner* — Ke Xiao
*Assistant Examiner* — Sarah Le
(74) *Attorney, Agent, or Firm* — Matthew B. Dernier, Esq.; Gibson & Dernier LLP

(57) ABSTRACT

Compressed image data of different resolutions stored in a hard disk drive is divided into blocks of substantially regular sizes. A determination is made as to whether a required block is stored in the main memory at predefined time intervals. If the block is not stored, the block is loaded into the main memory. Subsequently, the loaded compressed image data is referred to so that data for an image of an area required for display or for an image of an area predicted to be required is decoded and stored in a buffer memory. Of the images stored in a buffer area, i.e. a display buffer, the image of a display area is rendered in a frame memory. The display buffer and the decoding buffer are switched depending on the timing of completion of decoding or the amount of change in the display area.

19 Claims, 14 Drawing Sheets

(51) Int. Cl.

| | |
|---|---|
| *G09G 5/36* | (2006.01) |
| *G09G 5/34* | (2006.01) |
| *G09G 5/399* | (2006.01) |
| *G09G 5/393* | (2006.01) |
| *G09G 5/395* | (2006.01) |

(52) U.S. Cl.

CPC ........ (2013.01); *G09G 5/346* (2013.01); *G09G 2340/0407* (2013.01); *G09G 5/399* (2013.01); *G09G 5/393* (2013.01); *G09G 5/395* (2013.01); *G09G 2360/122* (2013.01); *G09G 2340/02* (2013.01)

USPC ........................................... 345/619; 345/684

(56) References Cited

U.S. PATENT DOCUMENTS

| | | | | |
|---|---|---|---|---|
| 7,190,838 | B2 * | 3/2007 | Le Leannec et al. | 382/233 |
| 7,768,516 | B1 * | 8/2010 | Bourdev et al. | 345/501 |
| 7,768,520 | B2 * | 8/2010 | Deb | 345/530 |
| 2002/0018072 | A1 * | 2/2002 | Chui | 345/667 |
| 2002/0051504 | A1 * | 5/2002 | Onno | 375/340 |
| 2002/0118144 | A1 * | 8/2002 | Edmonds | 345/1.1 |
| 2004/0207654 | A1 * | 10/2004 | Hasuike | 345/698 |
| 2004/0212843 | A1 * | 10/2004 | Kodama et al. | 358/426.01 |
| 2006/0082600 | A1 * | 4/2006 | Odagawa | 345/684 |
| 2006/0215200 | A1 * | 9/2006 | Mutsuro et al. | 358/1.13 |
| 2009/0252232 | A1 * | 10/2009 | Kishi et al. | 375/240.24 |

FOREIGN PATENT DOCUMENTS

| | | | |
|---|---|---|---|
| JP | 1188866 | A | 7/1989 |
| JP | 9114431 | A | 5/1997 |
| JP | 2004214983 | A | 7/2004 |
| JP | 200592007 | A | 4/2005 |
| JP | 2005181853 | A | 7/2005 |
| JP | 2005202327 | A | 7/2005 |
| JP | 2006113801 | A | 4/2006 |

OTHER PUBLICATIONS

Extended European Search Report for corresponding European patent Application No. 09817381.8, Jan. 2, 2012.

Office Action for corresponding Korean Patent Application No. 10-2011-7009478, Jan. 21, 2013.

International Search Report for corresponding PCT application PCT/JP2009/003043, dated Sep. 29, 2009.

International Preliminary Report on Patentability for corresponding PCT application PCT/JP2009/003043, dated May 10, 2011.

Office Action for corresponding JP Application No. 2008-255563, dated May 10, 2011.

Office Action for corresponding CN Application 200980138067.9, dated Apr. 9, 2013.

Office Action for corresponding JP Application 2008-255655, dated Apr. 23, 2013.

Office Action issued for corresponding Japanese Patent Application No. 2011-178769, dated Oct. 1, 2013.

* cited by examiner

IMAGE PROCESSING DEVICE AND IMAGE PROCESSING METHOD

TECHNICAL FIELD

The present invention relates to an image processing technology for enlarging/reducing an image displayed on a display, or moving the image upward, downward, leftward, or rightward.

BACKGROUND ART

Home entertainment systems are proposed capable of playing back moving images as well as running game programs. In home entertainment systems, a GPU generates three-dimensional images using polygons (see, for example, patent document No. 1).

Meanwhile, a technology is proposed capable of enlarging/reducing a displayed image or moving the image upward, downward, leftward, or rightward, using tile images of a plurality of resolutions generated from a digital image such as a high-definition photo. In this image processing technology, the size of an original image is reduced in a plurality of stages to generate images of different resolutions so as to represent the original image in a hierarchical structure where the image in each layer is divided into one or a plurality of tile images. Normally, the image with the lowest resolution comprises one tile image. The original image with the highest resolution comprises the largest number of tile images. An image processing device is configured to enlarge or reduce a displayed image such that an enlarged view or reduced view is presented efficiently by switching a currently used tile image to a tile image of a different layer.

PRIOR ART DOCUMENT

Patent Document

[patent document No. 1] U.S. Pat. No. 6,563,999

SUMMARY OF THE INVENTION

Problem to be Solved by the Invention

When a user requests the movement of a display area or enlargement or reduction of an image (hereinafter, these will be generically referred to "change in an image") in the image processing device, nonnegligible time may elapse before a new image is output due in order to read data for tile images or decode the data. Storage of the entirety of image data for high-definition or high-resolution images in a fast access memory for the purpose of improving response would require a large-capacity memory. This may enforce restriction on the data size of images that can be processed.

The present invention addresses the issue and a purpose thereof is to provide an image processing technology with excellent response to user request to change an image.

One embodiment of the present invention relates to an image processing device. The image processing device is adapted to display at least part of an image on a display, and comprises: a storage device configured to store a plurality of image blocks produced by dividing compressed data for an image subject to processing according to a predefined rule; a loading unit configured to load an image block that includes data for a required area, determined according to a predefined rule from an area of an image being displayed, from the storage device into a memory; and a displayed image processing unit configured to read, in accordance with a user request requesting movement, enlargement, or reduction of a display area, at least part of the image block loaded by the loading unit from the memory, to decode the read block, and to generate a new displayed image.

Another embodiment of the present invention relates to an image processing method. The image processing method is adapted to display at least part of an image on a display, and comprises: producing a plurality of image blocks by dividing compressed data for an image subject to processing according to a predefined rule and storing the image blocks in a storage device; loading an image block that includes data for a required area, determined according to a predefined rule from an area of an image being displayed, from the storage device into a memory; and reading, in accordance with a user request requesting movement, enlargement, or reduction of a display area, at least part of the image block loaded by the loading unit from the memory, decoding the read block, and generating a new displayed image.

Still another embodiment of the present invention relates to an image processing device. An image processing device is adapted to display an area in an image on a display according to user request, and comprises: a decoding unit configured to refer to the request and read compressed image data for a required area and to decode the read data; a buffer memory configured to store an image decoded by the decoding unit; and a rendering unit configured to read at least part of the image stored in the buffer memory and render an area that should be displayed, wherein the decoding unit comprises: an overlapping area acquisition unit configured to identify an area of overlapping between an image already stored and a new image stored in the buffer memory; a partial area decoding unit configured to decode compressed image data for an area including a partial area in the new image excluding the area of overlapping; and a decoded image storage unit configured to concatenate the area of overlapping in the image already stored with the partial area decoded by the partial area decoding unit and store the concatenated image in the buffer memory.

Yet another embodiment of the present invention relates to an image processing method. An image processing method is adapted to display an area in an image on a display according to user request, and comprises: identifying, when decoding compressed image data for a required area based upon the request and storing the decoded data, an area of overlapping between an image already stored and the new image; reading, from the main memory, compressed image data for an area in the new image including a partial area that excludes the area of overlapping, and decoding the read data, concatenating the area of overlapping in the image already stored with the partial area newly decoded, and storing the concatenated image in the buffer memory; and reading at least part of the image stored in the buffer memory and rendering an area that should be displayed.

Optional combinations of the aforementioned constituting elements, and implementations of the invention in the form of methods, apparatuses, systems, and computer programs may also be practiced as additional modes of the present invention.

Advantage of the Present Invention

According to the present invention, an image processing device with excellent response to user request to change an image is provided.

BEST MODE FOR CARRYING OUT THE INVENTION

Figure 1:
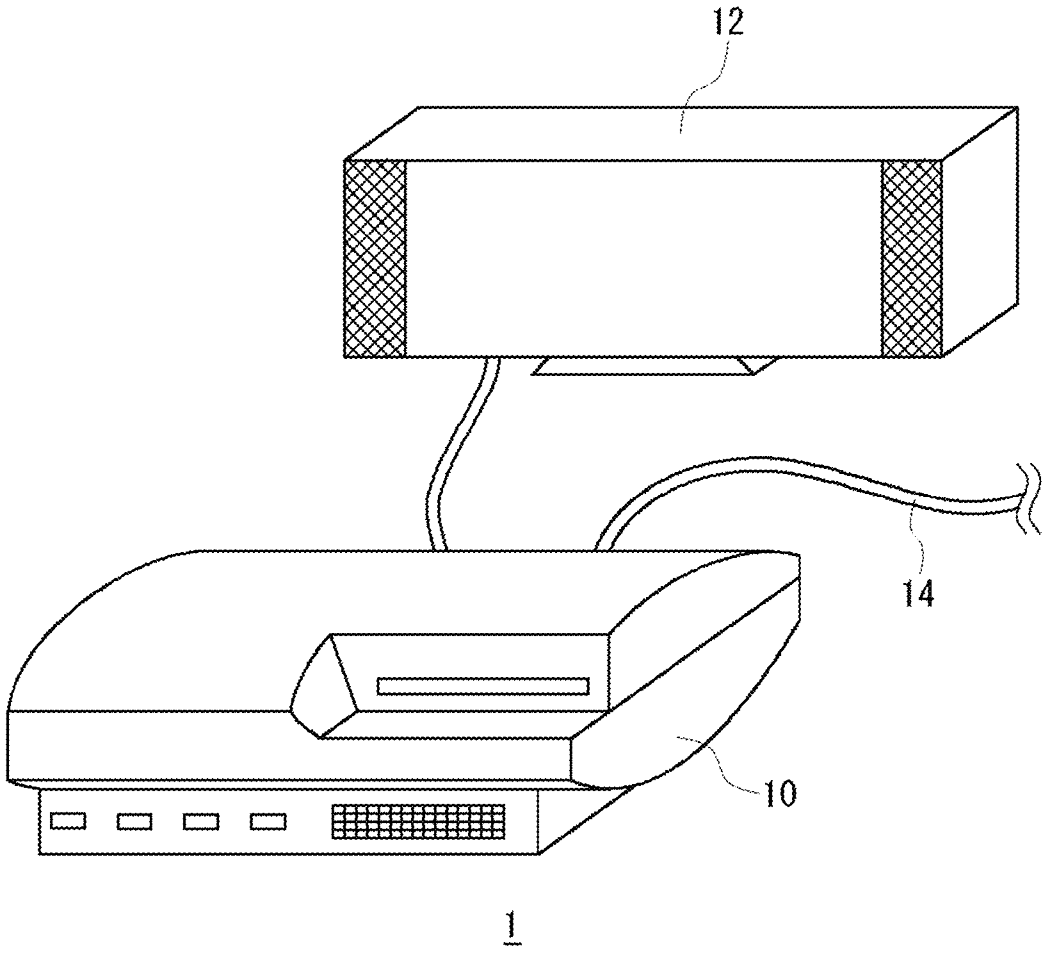
FIG. 1 shows an environment in which an image processing system according to an embodiment of the present invention is used.

FIG. 1 shows an environment in which an image processing system 1 according to an embodiment of the present invention is used. The image processing system 1 comprises an image processing device 10 configured to run image processing software and a display device 12 configured to output a result of processing by the image processing device 10. The display device 12 may be a television set provided with a display for outputting an image and a speaker for outputting sound. The display device 12 may be connected to the image processing device 10 by cable or connected wirelessly using, for example, wireless LAN (Local Area Network). The image processing device 10 in the image processing system 1 may be connected to an external network such as the Internet by a cable 14 and download and acquire hierarchized compressed image data. The image processing device 10 may be connected to an external network wirelessly.

The image processing device 10 may be a game device so that image processing functionality is achieved by loading an application for image processing. The image processing device 10 may be a personal computer so that image processing functionality is achieved by loading an application for image processing.

The image processing device 10 changes a displayed image by enlarging/reducing an image displayed on the display of the display device 12 or moving the image upward, downward, leftward, or rightward, in accordance with a user request. When the user manipulates an input device by viewing an image displayed on the display, the input device transmits a request signal to change a displayed image to the image processing device 10.

Figure 2:
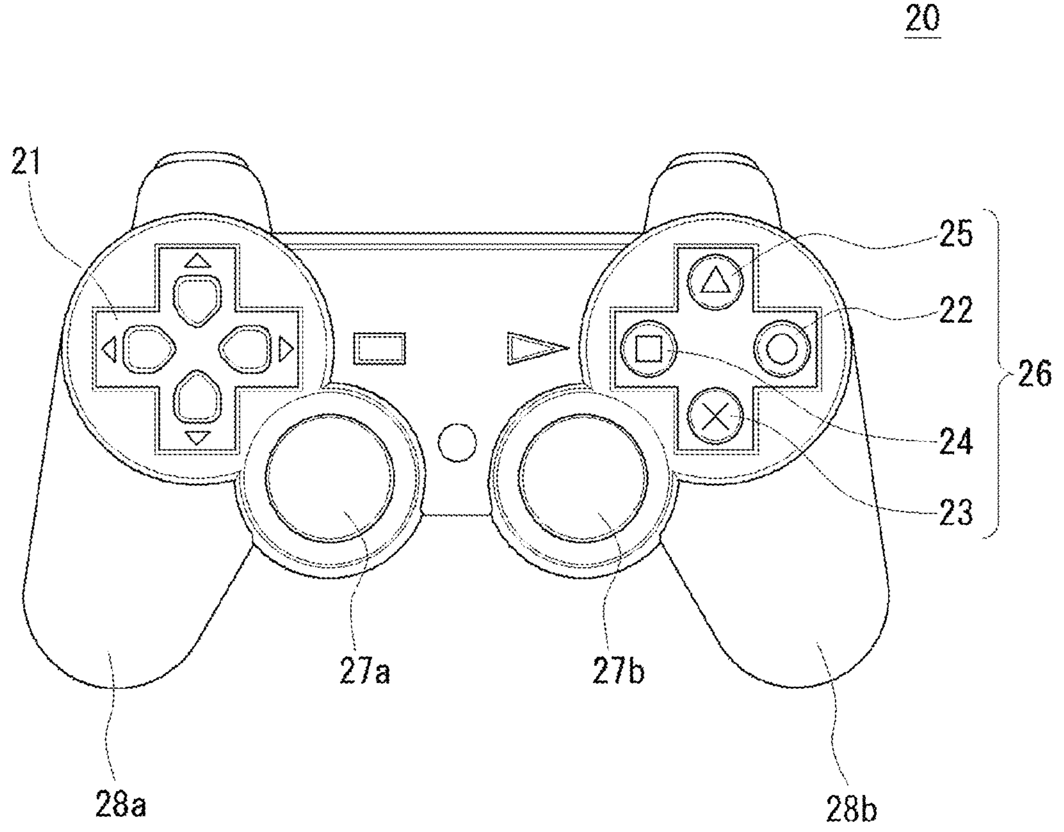
FIG. 2 shows the appearance of an input device that can be applied to the image processing system of FIG. 1.

FIG. 2 shows the appearance of the input device 20. The input device 20 is provided with directional keys 21, analog sticks 27*a*, 27*b*, and four control buttons 26, which are means for user control. The four buttons 26 comprises a circle button 22, a cross button 23, a square button 24, and a triangle button 25.

The user control means of the input device 20 in the information processing system 1 is assigned the function of entering a request for enlarging/reducing a displayed image, and entering a request for scrolling upward, downward, leftward, or rightward. For example, the function of entering a request for enlarging/reducing a displayed image may be allocated to the right analog stick 27*b*. The user can enter a request to reduce a displayed image by pulling the analog stick 27*b* toward the user and can enter a request to enlarge a displayed image by pushing it away from the user. The function of entering a request for moving a display area may be allocated to the directional keys 21. By pressing the directional keys 21, the user can enter a request for movement in the direction in which the directional keys 21 is pressed. The function of entering a request to change a displayed image may be allocated to alternative user control means. For example, the function of entering a request for scrolling may be allocated to the analog stick 27*a*.

The input device 20 has the function of transferring an input signal requesting change in an image to the image processing device 10. In the embodiment, the input device 20 is configured to be capable of communicating with the image processing device 10 wirelessly. The input device 20 and the image processing device 10 may establish communication using the Bluetooth (registered trademark) protocol or the IEEE802.11 protocol. The input device 20 may be connected to the image processing device 10 via a cable so as to transfer a signal requesting change in an image to the image processing device 10 accordingly.

Figure 3:
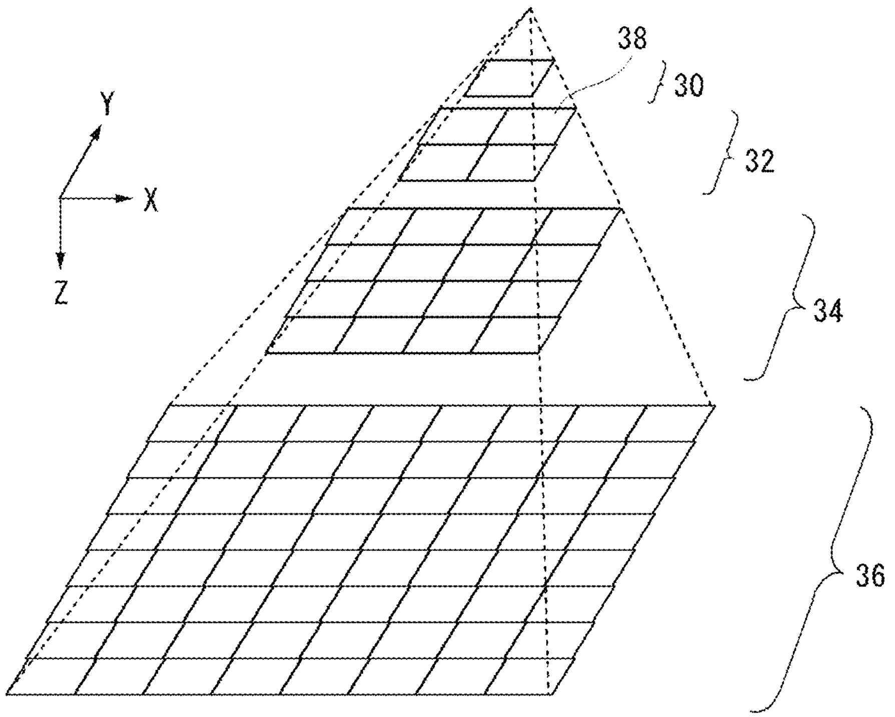
FIG. 3 shows the hierarchical structure of image data used in the embodiment.

FIG. 3 shows the hierarchical structure of image data used in the embodiment. The image data has a hierarchical structure comprising a 0-th layer 30, a first layer 32, a second layer 34, and a third layer 36 in the direction of depth (Z axis).

While the figure only shows four layers, the number of layers is nonrestrictive. Hereinafter, image data having such a hierarchical structure will be referred to as "hierarchical image data".

The hierarchical image data shown in FIG. 3 has a quadtree hierarchical structure. Each layer comprises one or more tile images 38. All of the tile images 38 are formed to have the same size having the same number of pixels. For example, an image includes 256×256 pixels. The image data in the respective layers are representations of an image in different resolutions. The original image in the third layer 36 having the highest resolution is reduced in a plurality of stages to generate the image data for the second layer 34, the first layer 32, and the 0-th layer 30. For example, the resolution in the Nth layer (N is an integer equal to or greater than 0) may be ½ the resolution of the (N+1)th layer in both the horizontal (X axis) direction and the vertical (Y axis) direction.

The hierarchical image data is compressed in a predefined compression format and is stored in a storage device and is read from the storage device and decoded before being displayed on the display. The image processing device 10 according to the embodiment is provided with the decoding function compatible with a plurality of compression formats. For example, the device is capable of decoding compressed data in the S3TC format, JPEG format, JPEG2000 format. Compression may be performed for each tile image. Alternatively, a plurality of tile images included in the same layer or a plurality of layers may be compressed at a time.

As shown in FIG. 3, the hierarchical structure of hierarchical data is configured such that the horizontal direction is defined along the X axis, the vertical direction is defined along the Y axis, and the depth direction is defined along the Z axis, thereby building a virtual three-dimensional space. Upon deriving the amount of change in the displayed image by referring to the signal supplied from the input device 20 and requesting change in the image, the image processing device 10 uses the amount of change to derive the coordinates at the four corners of a frame (frame coordinates) in the virtual space. Frame coordinates in the virtual space are used to load data into the main memory or generate a displayed image. Instead of the frame coordinates in the virtual space, the image processing device 10 may derive information identifying the layer and the texture coordinates (UV coordinates) in the layer. Hereinafter, the combination of the information identifying the layer and the texture coordinates will also be referred to as frame coordinates.

Figure 4:
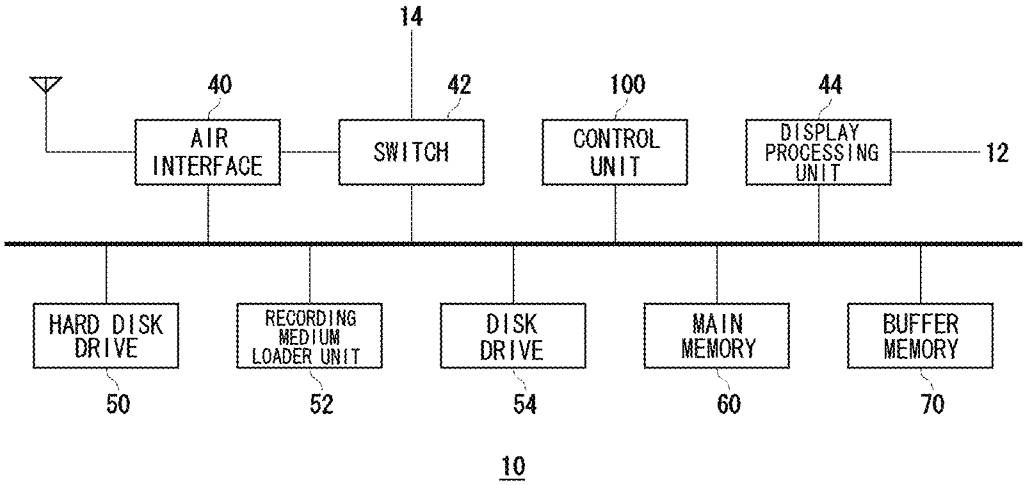
FIG. 4 shows the configuration of the image processing device according to the embodiment.

FIG. 4 shows the configuration of the image processing device 10. The image processing device 10 comprises an air interface 40, a switch 42, a display processing unit 44, a hard disk drive 50, a recording medium loader unit 52, a disk drive 54, a main memory 60, a buffer memory 70, and a control unit 100. The display processing unit 44 is provided with a frame memory for buffering data to be displayed on the display of the display device 12.

The switch 42 is an Ethernet switch (Ethernet is a registered trademark), a device connected to an external device by cable or wirelessly so as to transmit and receive data. The switch 42 may be connected to an external network via the cable 14 so as to receive hierarchized compressed image data from an image server. The switch 42 is connected to the air interface 40. The air interface 40 is connected to the input device 20 using a predefined wireless communication protocol. A signal requesting change in an image as input by the user via the input device 20 is supplied to the control unit 100 via the air interface 40 and the switch 42.

The hard disk drive 50 functions as a storage device for storing data. The compressed image data received via the switch 42 is stored in the hard disk drive 50. When a removable recording medium such as a memory card is mounted, the recording medium loader unit 52 reads data from the removable recording medium. When a ROM disk is mounted, the disk drive 54 drives and recognizes the ROM disk so as to read data. The ROM disk may be an optical disk or a magneto-optical disk. The compressed image data may be stored in the recording medium.

The main controller 100 is provided with a multicore CPU. One general-purpose processor core and a plurality of simple processor cores are provided in a single CPU. The general-purpose processor core is referred to as a power processing unit (PPU) and the other processor cores are referred to as synergistic-processing units (SPU).

The main controller 100 is provided with a memory controller connected to the main memory 60 and the buffer memory 70. The PPU is provided with a register and a main processor as an entity of execution. The PPU efficiently allocates tasks as basic units of processing in applications to the respective SPUs. The PPU itself may execute a task. The SPU is provided with a register, a subprocessor as an entity of execution, and a local memory as a local storage area. The local memory may be used as the buffer memory 70.

The main memory 60 and the buffer memory 70 are storage devices and are formed as random access memories (RAM). The SPU is provided with a dedicated direct memory access (DMA) controller and is capable of high-speed data transfer between the main memory 60 and the buffer memory 70. High-speed data transfer is also achieved between the frame memory in the display processing unit 44 and the buffer memory 70. The control unit 100 according to the embodiment implements high-speed image processing by operating a plurality of SPUs in parallel. The display processing unit 44 is connected to the display device 12 and outputs a result of image processing in accordance with user request.

The image processing device 10 according to the embodiment is configured to load part of the compressed image data identified by a rule described later from the hard disk drive 50 into the main memory 60 in order to change a displayed image smoothly as the displayed image is enlarged/reduced or the display area is moved. Further, the device 10 is configured to decode part of the compressed image data loaded into the main memory 60 and store the decoded data in the buffer memory 70. This allows instant switching of images used for creation of displayed image when the switching is required later.

Figure 5:
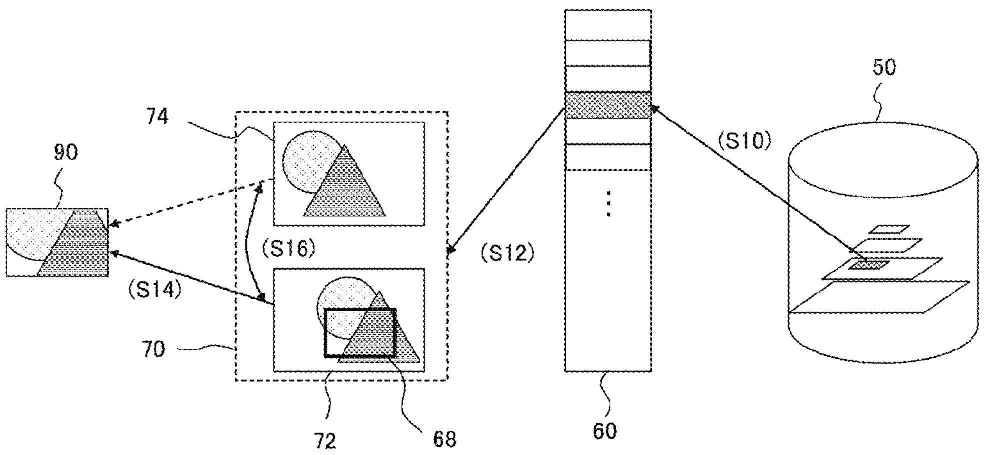
FIG. 5 schematically shows the flow of image data according to the embodiment.

FIG. 5 schematically shows the flow of image data according to the embodiment. Hierarchical data is stored in the hard disk drive 50. A recording medium mounted on the recording medium loader unit 52 or the disk drive 54 may store the data instead of the hard disk 50. Alternatively, the image processing device 10 may download hierarchical data from an image server connected to the device 10 via the network. As described above, the hierarchical data is compressed in a fixed-length format such as S3TC or in a variable-length format such as JPEG.

Of the hierarchical data, part of the image data is loaded into the main memory 60, maintaining a compressed state (S10). An area to be loaded is determined according to a predefined rule. For example, an area close to the currently displayed image in the virtual space, or an area predicted to be frequently requested for display, from a viewpoint of the content of image or the history of browsing by the user, is loaded. The data is loaded not only when a request to change an image is originated but also at predefined time intervals. This prevents heavy traffic for loading processes from occurring in a brief period of time.

Compressed image data is loaded in units of blocks having a substantially regular size. For this reason, the hierarchical data stored in the hard disk drive 50 is divided into blocks according to a predefined rule. In this way, data management in the main memory 60 can be performed efficiently. Even if the compressed image data is compressed in a variable-length format, the data as loaded would have an approximately equal size if the image is loaded in units of blocks (hereinafter, referred to as "image blocks"). Therefore, a new loading operation is completed basically by overwriting one of the blocks already stored in the main memory 60. In this way, fragmentation is unlikely to occur, the memory is used efficiently, and address management is easy.

Of the compressed image data stored in the main memory 60, data for an image of an area required for display, or data for an image of an area predicted to be necessary is decoded and stored in the buffer memory 70 (S12). The buffer memory 70 includes at least two buffer areas 72 and 74. The size of the buffer areas 72 and 74 is configured to be larger than the size of the frame memory 90 so that, when the signal entered via the input device 20 requests change of a certain degree or less, the image data loaded in the buffer areas 72 and 74 is sufficient to create a displayed image.

One of the buffer areas 72 and 74 is used to store an image for creation of displayed image and the other is used to make available an image predicted to become necessary subsequently. Hereinafter, the former buffer will be referred to as "display buffer" and the latter will be referred to as "decoding buffer". In the example of FIG. 5, the buffer area 72 is a display buffer, the buffer area 74 is a decoding buffer, and a display area 68 is being displayed. The image stored in the decoding buffer in a prefetch process may be of the same layer as the image stored in the display buffer or of a different layer with a different scale.

Of the images stored in the buffer area 72, i.e., the display buffer, the image of the display area 68 is rendered in the frame memory 90 (S14). Meanwhile, the image of a new area is decoded as necessary and stored in the buffer area 74. The display buffer and the decoding buffer are switched depending on the timing of completion of storage or the amount of change in the display area 68 (S16). This allows smooth switching between displayed images in the event of the movement of a display area or change in the scale.

In further accordance with the embodiment, in the event that the image of a new area that should be stored in the decoding buffer includes an area overlapping the image already decoded and stored, areas that are newly decoded are minimized by using the existent area. Details of the inventive method will be given later.

Figure 6:
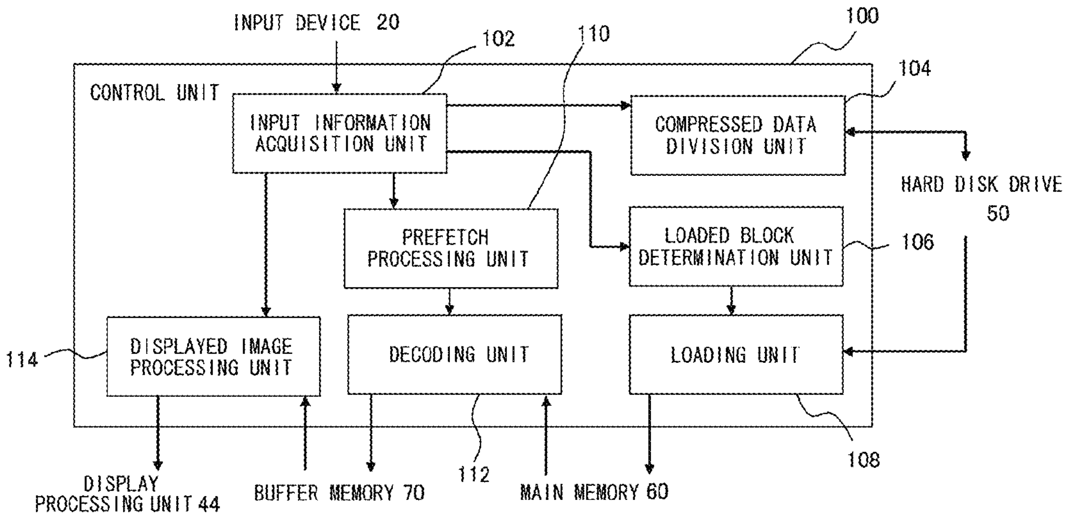
FIG. 6 shows the configuration of the control unit according to the embodiment in detail.

FIG. 6 shows the configuration of the control unit 100 in detail. The control unit 100 comprises an input information acquisition unit 102 for acquiring information entered by the user via the input device 20, a compressed data division unit 104 for dividing hierarchical data into image blocks, a loaded block determination unit 106 for determining an image block that should be newly loaded, and a loading unit 108 for loading a necessary image block from the hard disk drive 50. The control unit 100 further comprises a displayed image processing unit 114 for rendering a displayed image, a prefetch processing unit 110 for performing a prefetch process, a decoding unit 112 for decoding compressed image data.

The elements depicted in FIG. 6. as functional blocks for performing various processes are implemented in hardware such as a central processing unit (CPU), memory, or other LSI's, and in software such as a programs etc., loaded into the memory. As describe above, the control unit 100 includes one PPU and a plurality of SPUs. The PPU and the SPUs form the functional blocks alone or in combination. Therefore, it will be obvious to those skilled in the art that the functional blocks may be implemented in a variety of manners by hardware only, software only, or a combination of thereof.

The input information acquisition unit 102 acquires an instruction entered by the user via the input device 20 to start/terminate displaying an image, move the display area, enlarge or reduce the displayed image, etc.

The compressed data division unit 104 reads hierarchical data from the hard disk drive 50, generates image blocks by dividing the data according to a predefined rule described later, and stores the divided data in the hard disk drive 50. For example, when the user uses the input device 20 to select one of the hierarchical data stored in the hard disk drive 50, the unit 104 acquires the information accordingly from the input information acquisition unit 102 and starts a dividing process.

Meanwhile, the compressed data division unit 104 may not be located in the same device as the other functions of the control unit 100. Hierarchical data may be divided when needed. Details of the specific method will be described later, but the method of division into blocks performed by the compressed data division unit 104 may differ depending on hardware performance such as the speed of the hard disk drive 50 or the capacity of the main memory 60. Therefore, the compressed data division unit 104 is preconfigured to divide data into blocks in adaptation to the hardware performance of the image processing device 10.

The loaded block determination unit 106 verifies whether there are image blocks that should be loaded from the hard disk drive 50 into the main memory 60 and determines the image block that should be loaded next, issuing a load request to a loading unit 108. The loaded block determination unit 106 performs the above-mentioned verification and determination according to a predefined timing schedule while the loading unit 108 is not performing loading process. For example, verification and determination may be performed when a predefined period of time elapses or when the user requests change in the image. The loading unit 108 performs an actual loading process in accordance with a request from the loaded block determination unit 106.

If the image block including the destination image area is not stored in the main memory 60 upon occurrence of the user request to change the displayed image, it is necessary to perform the steps of loading the image block from the hard disk drive 50, decoding the necessary area, and rendering the displayed image in one setting. The loading process may represent a bottle neck in this case, with the result that the response to the user request may become poor. In the embodiment, the following policies are observed to load blocks, namely, (1) image blocks are loaded so as to exhaustively cover areas that are highly likely to be displayed, (2) loading takes place on a as-needed basis so that heavy traffic for loading processes is prevented from occurring in a brief period of time. This reduces the likelihood that the loading process drags the process for changing the displayed image. The procedure of determining an image block loaded will be described in detail later.

The prefetch processing unit 110 predicts the image area expected to be needed for rendering of a displayed image in the future, in accordance with the frame coordinates of the currently displayed image and information related to the user request to change the displayed image, and supplies the resultant information to the decoding unit 112. However, prediction is not performed immediately after an image is started to be displayed, or when the destination image cannot be rendered using the image stored in the buffer 70. In these cases, the prefetch processing unit 110 supplies information on an area that includes the image currently necessary to render the displayed image to the decoding unit 112. The decoding unit 112 reads and decodes part of the compressed image data from the main memory 60 by referring to the information on the image area acquired from the prefetch processing unit 110 and stores the decoded data in the decoding buffer or the display buffer.

The displayed image processing unit 114 determines the frame coordinates of the new displayed image in accordance with user request to change the displayed image, reads the corresponding image data from the display buffer of the buffer memory 70, and renders the image in the frame memory 90 of the display processing unit 44.

Figure 7:
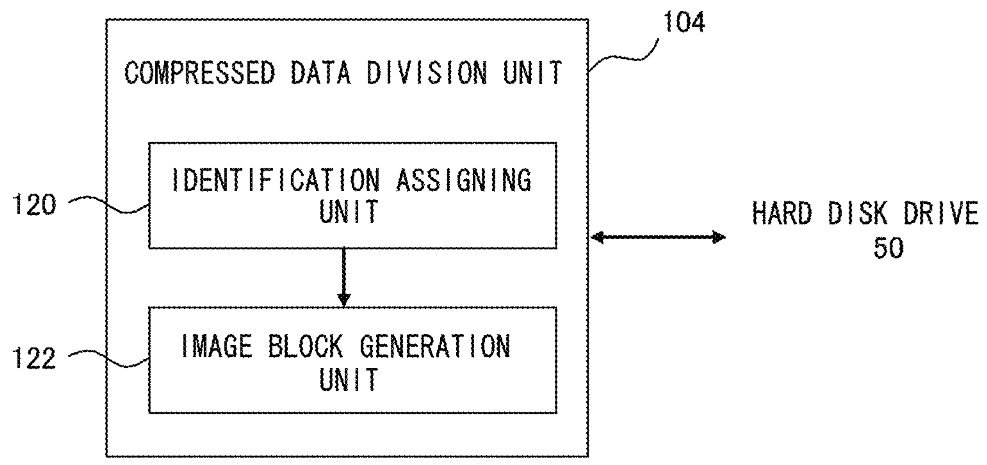
FIG. 7 shows the configuration of the compressed data division unit according to the embodiment in detail.

A description will now be given of the method of dividing hierarchical data into image blocks. FIG. 7 shows the configuration of the compressed data division unit 104 in detail. The compressed data division unit 104 includes an identification number assigning unit 120 and an image block generation unit 122. The identification number assigning unit 120 assigns identification numbers to tile images in the layers forming the hierarchical data in a predefined order, starting with 0. The image block generation unit 122 forms image blocks by organizing tile images in the order of identification numbers to the extent that the total data size does not exceed a predefined size.

Figure 8:
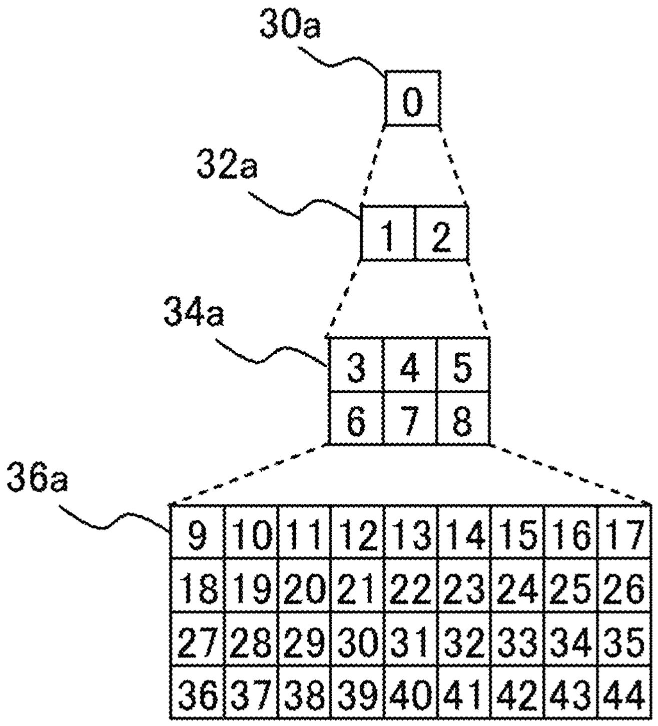
FIG. 8 schematically shows images in respective layers in hierarchical data according to the embodiment.

FIG. 8 schematically shows images in respective layers in hierarchical data. As in the case of FIG. 3, the hierarchical data has comprises a 0-th layer 30*a*, a first layer 32*a*, a second layer 34*a*, and a third layer 36*a*. The image in each layer comprises tile images, which are represented by a partition marked by a solid line. As shown in the figure, the identification number assigning unit 120 assigns an identification number to each tile image. For example, the image in the 0-th layer 30*a* comprises one tile image with an identification number “0”. Identification numbers “1” and “2”, “3” through “8”, and “9” through “44” are assigned to the tile images in the first layer 32*a*, the second layer 34*a*, and the third layer 36*a*, respectively. In the example of FIG. 8, the order of assigning identification numbers is assumed to be identical to the order of rastering. As mentioned later, identification numbers may be assigned in other orders.

Figure 9:
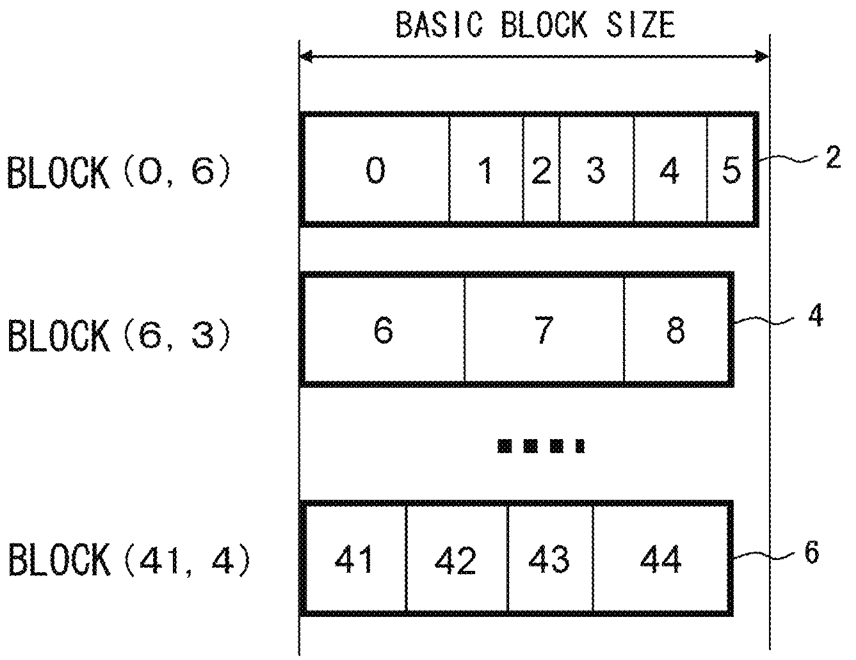
FIG. 9 schematically shows how the image block generation unit according to the embodiment organizes the hierarchical data of FIG. 8 into image blocks.

FIG. 9 schematically shows how an image block generation unit 122 organizes the hierarchical data of FIG. 8 into image blocks. As described above, the image block generation unit 122 groups the tile images so that an image block is formed to contain the maximum number of tile images on the condition that a predefined data size is not exceeded. The figure indicates “a predefined data size” as “a basic block size”, which is illustrated as a range marked by arrows.

In the illustrated example, tile images with the identification numbers “0” through “5” are organized as an image block 2, tile images “6” through “8” are organized as an image block 4, etc. Tile images “41” through “44” are organized as the last image block 6. Each image block is identified by the identification number of the start tile image in the block and the number of tile images included. Therefore, the image block 2 has identification information “(0,6)”, the image block 4 has identification information “(6,3)”, and the image block 6 has identification information “(41,4)”. By defining identification information thus, it is easy to determine whether a given tile image is included in an image block. In other words, regardless of a method of dividing data into blocks, a tile image included in an image block can be identified merely by examining a range of identification numbers.

Identification information on image blocks is stored in the hard disk drive 50 by associating the identification information with information on an area in the hard disk drive 50 storing the corresponding compressed image data. Division of compressed hierarchical data into image blocks of about the same size is advantageous in that, given the image blocks loaded and stored in continuous areas in the main memory 60, blocks can be stored by overwriting an image block by a subsequently loaded image block. The likelihood of fragmentation is reduced and the main memory 60 can be used efficiently.

Figure 10:
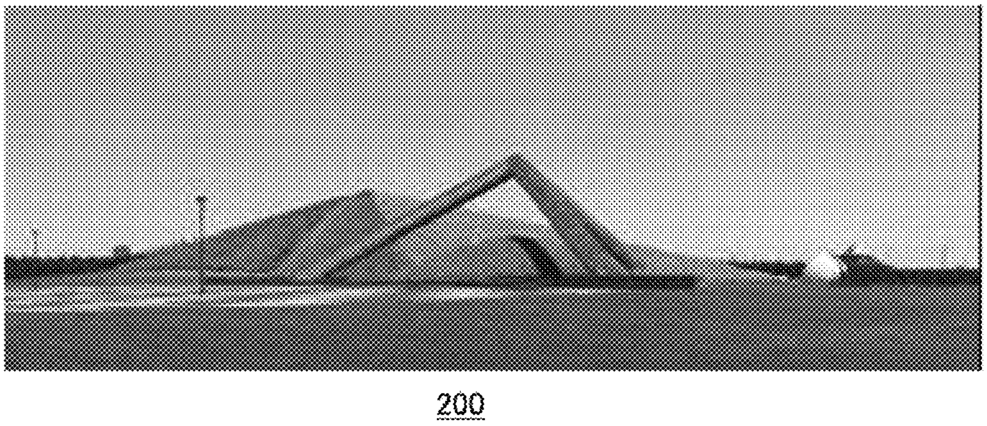
FIG. 10 shows an example of an original image to illustrate a method of dividing data into blocks according to the embodiment.

In the case that image blocks are grouped in the order of identification numbers as described above, the order of assigning identification numbers to tile images largely affects the way an original image is divided. Several examples will be given below. FIG. 10 shows an example of an original image to illustrate a method of dividing data into blocks according to the embodiment. FIGS. 10-14 show gray scale images but full color images may equally be subject to the inventive method. For example, an original image 200 has 92323×34630 pixels and the image is divided into a total of 361×136 tile images.

Figure 11:
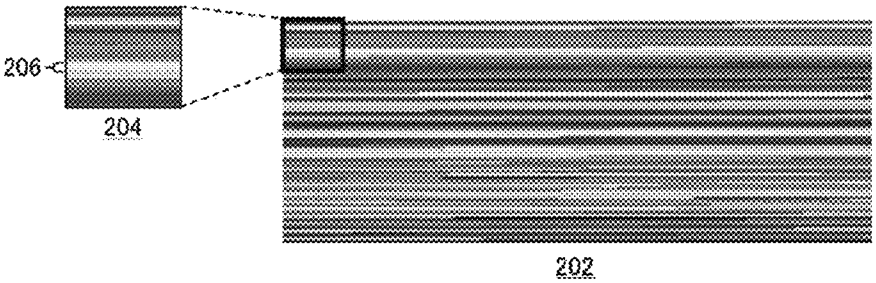
FIG. 11 shows how the image is divided when identification numbers are assigned to tile images in the order of rastering according to the embodiment.

FIGS. 11-14 show how the original image 200 of FIG. 10 is divided in various orders of assigning identification numbers, using a basic block size of 1M byte. To illustrate the boundary between image blocks clearly, the image blocks are shown with different gray scale patterns. FIG. 11 shows how an image is divided when identification numbers are assigned to tile images in the order of rastering as shown in FIG. 8. The raster order based divided image 202 is shown in the figure as being divided into image blocks each comprising tile images organized in the horizontal direction. A width 206 shown in an enlarged view 204 of the image represents the vertical length of the image block. The length in the horizontal direction varies depending on the size of compressed data for tile images included in the image block. A single image block may extent to include a plurality of lines of tile images.

The process of assignment will be easy by employing the order of assigning identification numbers shown in FIG. 11. By dividing an image into blocks in this way, a given image block will have more information in the horizontal direction than in the vertical direction. Therefore, in the case of the image with a content where the display area is more often moved in the horizontal direction than otherwise, image blocks can be stored in the main memory 60 in such a way that display areas required after the requested movement are exhaustively covered in a small number of loading operations. Meanwhile, if the movement of a display area is not characterized as described above, the above-described method of blocking will require loading of a large number of image blocks to generate a single displayed image and importing unnecessary information remote from the displayed area, resulting in poor efficiency.

Figure 12:
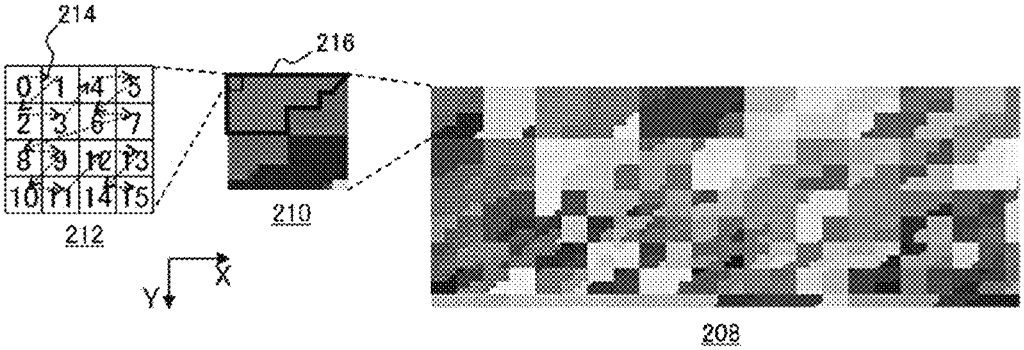
FIG. 12 shows how an image is divided when identification numbers are assigned to tile images in the order characterized by a "Z pattern" according to the embodiment.

FIG. 12 shows how an image is divided when identification numbers are assigned to tile images in the order characterized by a “Z pattern”. The term “the order characterized by a Z pattern” means the order of alternately increasing the number in the horizontal direction (X direction) and in the vertical direction (Y direction) as shown in a scanning order 214 in an example 212 of assigning identification numbers as shown. The identification numbers are assigned as shown. Organizing tile images in this way results in image blocks ordered in a Z pattern based divided image 208 as shown. Referring to an enlarged view 210, an image block has a shape such as that of an image block 216.

According to this method, identification numbers are assigned by aggregating tile images in the same increment in the horizontal direction and in the vertical direction, starting with a given tile image. Therefore, a substantially square-shaped image block 216 results. Specific shape and size depend on the size of compressed data for tile images included in each image block. By dividing the image into blocks as shown in FIG. 12, information contained in an image block will be highly localized in the space so that the number of image blocks necessary to generate a displayed image or an image in an area in the neighborhood thereof will be smaller than in the case of FIG. 11. Another advantage is that information on unnecessary areas is unlikely to be loaded so that the efficiency of using the main memory 60 is improved.

Figure 13:
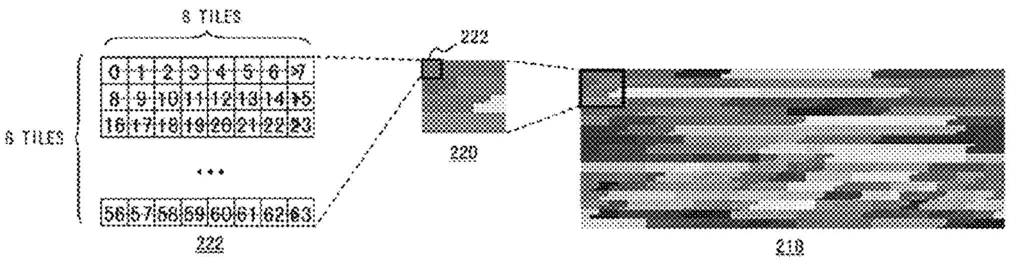
FIG. 13 shows how an image is divided when identification numbers are assigned to tile images in the order defined by a square macrotile according to the embodiment.

FIG. 13 shows how an image is divided when identification numbers are assigned to tile images in the order defined by a square macrotile. A "macrotile" is a rectangle formed of a plurality of tile images. The number of tile images included vertically or horizontally is predefined. In the case of example of FIG. 12, it can be said that macrotiles each comprising 2×2 tile images are recursively formed. In the case of FIG. 13, a square formed of 8×8 tile images is defined as a single macrotile, as shown in a macrotile 222. Within the macrotile 222, identification numbers are assigned in the direction indicated by the arrow, i.e., in the order of rastering. As a result, identification numbers are assigned to the tile images as indicated by numerals in the figure. When identification numbers have been assigned to a given macrotile, similar assignment is performed to the rest of the macrotiles in the order of rastering.

Organizing tile images in this way results in image blocks ordered in a square macrotile-based divided image 218 as shown. In this case, macroblocks organized in the horizontal direction defines the shape of an image block. Referring to an enlarged view 220, the length of a side of the macrotile 222 or an integral multiple thereof represents the vertical length of an image block. The horizontal length varies depending on the size of compressed data for tile images included in each image block. As in the case of FIG. 12, block division as shown in FIG. 13 reduces the number of image blocks necessary to generate a displayed image or an image in an area in the neighborhood thereof and improves the efficiency of loading.

Figure 14:
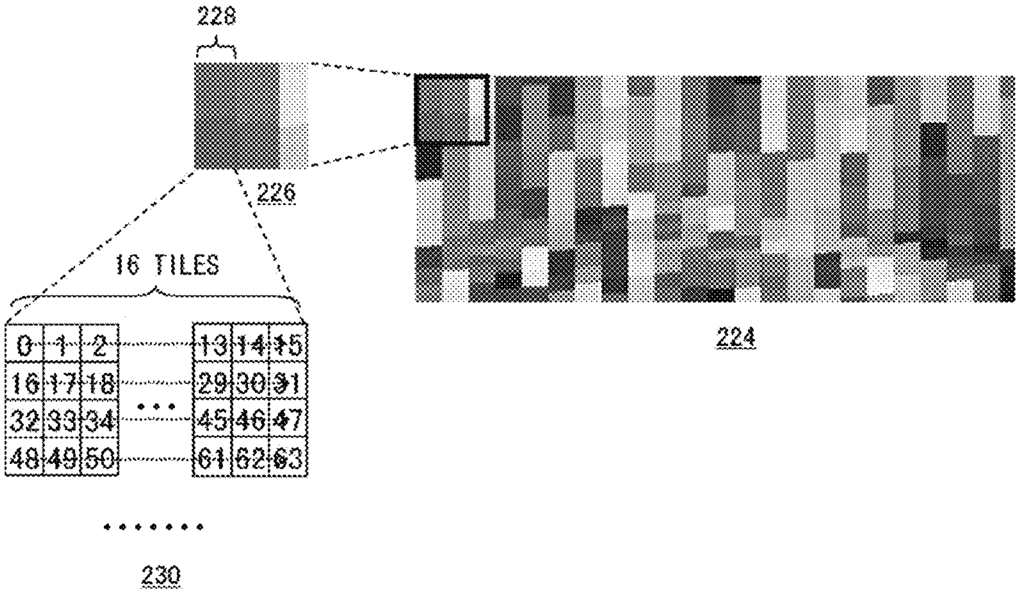
FIG. 14 shows how an image is divided when identification numbers are assigned to tile images in the order defined by a strip macrotile according to the embodiment.

FIG. 14 shows how an image is divided when identification numbers are assigned to tile images in the order defined by a strip macrotile. In a strip macrotile, only the number of tile images included in the horizontal direction is defined and the number of tile images included in the vertical direction is not limited. In the case of FIG. 14, a total of 16 tile images are arranged in the horizontal direction, as shown in the macrotile 230. Within the macrotile 230, identification numbers are assigned in the direction indicated by the arrow, i.e., in the order of rastering. As a result, identification numbers are assigned to the tile images as indicated by numerals in the figure. When identification numbers have been assigned until the lower end of the original image is reached, identification numbers are similarly assigned to the tile images in the macrotile to the right. The step is repeated in the order of rastering until all of the macrotiles are assigned identification numbers.

Organizing tile images in this way results in image blocks ordered in a strip macrotile-based divided image 224 as shown. An image block in this case has a shape defined by slicing a vertical row of macrotiles in the middle in accordance with the size of compressed data for tile images. In some cases, an image block may extend over a plurality of rows of macrotiles. Referring to an enlarged view 226, a width 228 of a macrotile or an integral multiple thereof represents the horizontal width of an image block. The detailed shape of the boundary between image blocks produced by slicing also varies depending on the size of compressed data for tile images. As in the case of FIGS. 12 and 13, block division as shown in FIG. 14 also reduces the number of image blocks necessary to generate a displayed image or an image in an area in the neighborhood thereof and improves the efficiency of loading.

As described above, the shape or size of an image block, and information included therein vary largely depending on the order of assigning identification numbers or the basic block size. In this respect, conditions that allow the most efficient data incorporation may be determined depending on the image content or genre (e.g., whether the image is a picture of a scenery or an image showing newspaper characters) so that a condition is selected in accordance with an actual image. As mentioned before, the most suitable method may be selected depending on the hardware configuration.

As described above, an image block obtained as a result of dividing an image is a collection of tile images of a substantially uniform data size. Therefore, the area occupied depends on the size of compressed data for tile images. In the original image 200 of FIG. 10, the upper half of the image is an area for the sky and is characterized by a relatively uniform color. Therefore, there are few high-frequency components so that the compression ratio is high. Meanwhile, the neighborhood of the center of the original image 200 is occupied by buildings and is characterized by large variation in the color. There are many high-frequency components so that compression ratio is low. Accordingly, the size of compressed data for tile images in the upper half of the original image 200 tends to be smaller than the data size toward the center.

Referring to a strip macrotile-based divided image 224 of FIG. 14 in light of the above finding, the area of image blocks in the upper half tends to be larger than that of image blocks near the center. The same holds true of the other divided images. In other words, according to the embodiment, the area of an image is not simply divided into equal parts but is divided according to the data size. In this way, where the data size per unit area is small, compressed data for a large area can be stored in the main memory 60 in a single step of loading. This facilitates management by reducing the number of blocks that should be managed in the memory and improves the efficiency of loading.

In the example of the Z pattern based divided image 208 shown in FIG. 12, it is ensured that image blocks approximate squares by assigning identification numbers in a Z pattern and that spatial locality is improved. In the example of the figure, once the tile image already assigned identification numbers reaches a square of a predefined size, identification numbers continue to be assigned starting with a new starting point. The starting points are arranged in the original image 200 in a matrix pattern. For this reason, the boundaries between image blocks present lattices the sides of which intersect at right angles. Meanwhile, the division may be designed so that the boundaries between image blocks do not present lattices.

Figure 15:
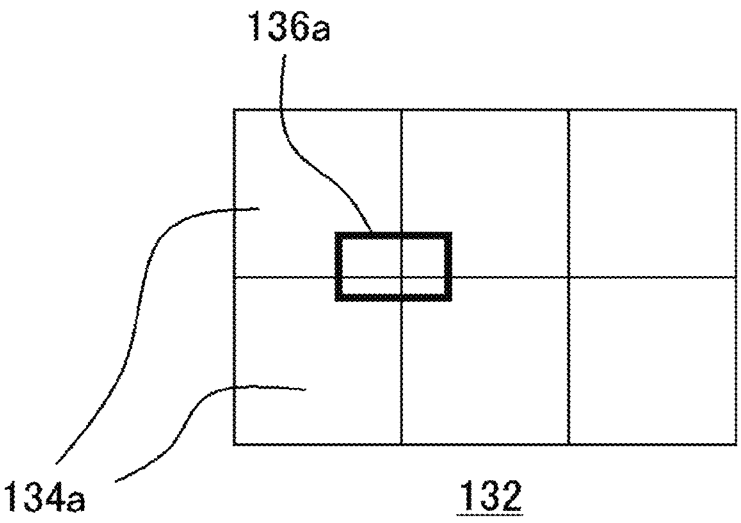
FIG. 15 schematically shows a relation between image blocks and a rendering area of the displayed image when the boundaries between image blocks represent lattices.

FIG. 15 schematically shows a relation between image blocks and a rendering area of the displayed image when the boundaries between image blocks represent lattices. In one area 132 in the original image, image blocks 134*a* form a matrix of three blocks in the horizontal direction and two blocks in the vertical direction. The boundaries between the blocks present lattices. By dividing an image into blocks as described above, four image blocks will be necessary for rendering, if a rendering area 136*a* is located to include an intersection of the lattices as shown.

Figure 16:
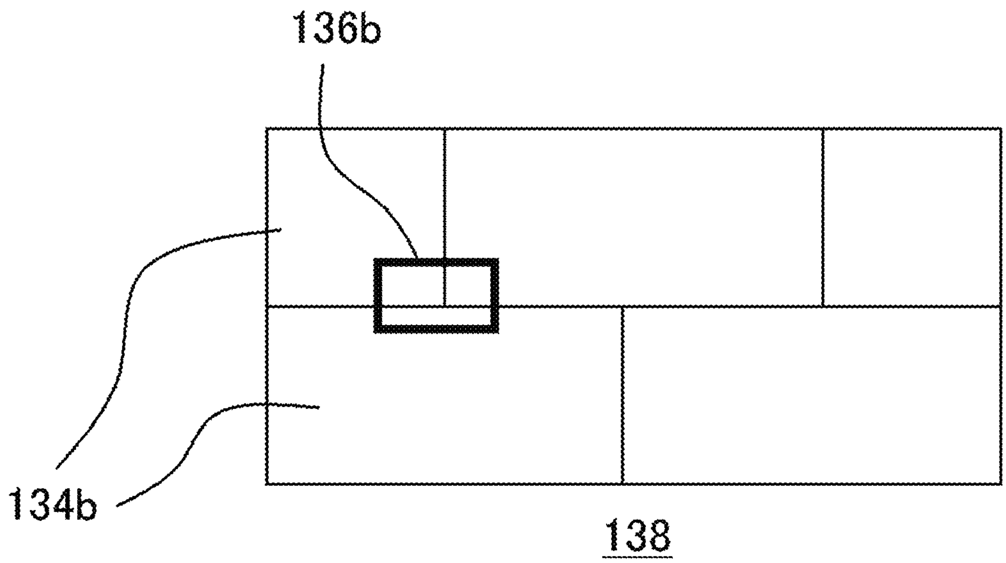
FIG. 16 schematically shows a relation according to the embodiment between image blocks and a rendering area of the displayed image when the boundaries between image blocks present T-shaped intersections.

FIG. 16 schematically shows a relation between image blocks and a rendering area of the displayed image when the boundaries between image blocks present T-shaped intersections. In one area 138 of the original image, image blocks 134*b* are arranged such that the vertical boundaries are displaced from each other from row to row with the result that the boundaries present T-shaped intersections. By dividing an image into blocks as described above, the maximum number of image blocks necessary for rendering will be three even if the rendering area 136*b* extends over the boundary as shown. As compared to the case of FIG. 15, the efficiency of loading is improved. To arrange image blocks as described above, starting points where identification numbers are started to be assigned may for example be displaced from row to row instead of arranging the starting points in a matrix.

The block division methods described above all pertain to an image located in a layer. A single image block may include information on tile images on a plurality of layers by assigning identification numbers to extend over a plurality of layers. In this way, the frequency of loading is reduced not only in the event that a display area is moved on an image in a layer but also in the event that the displayed image is enlarged or reduced.

Tile images from a plurality of layers may simply be compressed in a uniform manner before organizing them in an image block. Alternatively, redundancy between images covering the same area and having different resolutions may be utilized so that one of the images is restored using another image, thereby increasing the compression ratio. In the embodiment, information included in an image block is loaded at a time without exception. Therefore, the aforementioned strategy is possible. For example, a differential image indicating a difference between an image obtained by enlarging a low-resolution image to the magnification factor of a high-resolution image and an actual high-resolution image may be compressed and included in an image block along with the compressed data for the low-resolution image. In this case, an image block is organized in the order of a low-resolution image and a differential image. When the maximum data size that does not exceed the basic block size is reached, a subsequent image block is generated.

Figure 17:
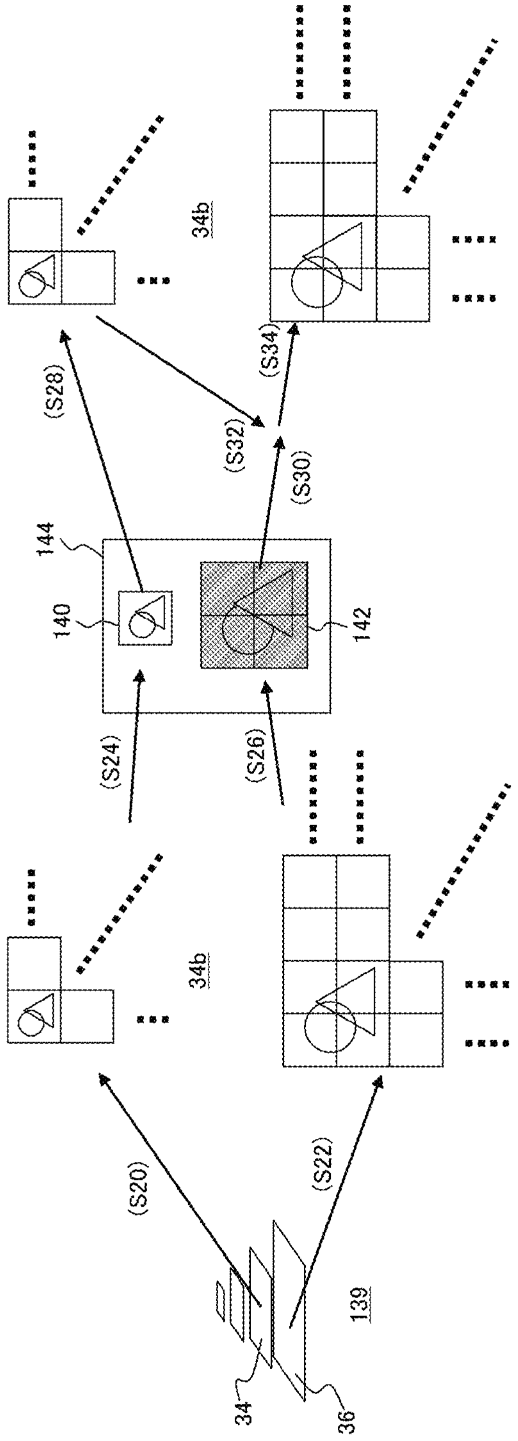
FIG. 17 shows a method of compressing a high-resolution image as a differential image indicating a difference from an enlarged version of a low-resolution image according to the embodiment.

FIG. 17 shows a method of compressing a high-resolution image as a differential image indicating a difference from an enlarged version of a low-resolution image. The process of FIG. 17 is performed by the compressed data division unit 104. The process may be performed when hierarchical data is generated and separately from the other processes related to image display. Initially, original images in the second layer 34 and the third layer 36 in the hierarchical data 139 are read (S20, S22). As shown, a third layer image 36*b* in the embodiment has 2×2 times the resolution of a second layer image 34*b*. Of these images, several of the tile images of the second layer image 34*b* are compressed normally (S24). Subsequently, instead of compressing corresponding tile images of the third layer image 36*b*, a differential image indicating a difference between the corresponding tile images of the third layer image 36*b* and 2×2 enlarged versions of the tile images of the second layer image 34*b* is compressed (S26).

For example, the tile images in the second layer image 34*b* subject to compression may be tile images in an area obtained by dividing the original image to blocks of substantially the same data size, as illustrated in FIGS. 11-14. Alternatively, the number of tile images may be predefined so that the data size may be adjusted to be uniform when forming an image block as described above.

As a result, compressed data 140 of the second layer image 34*b* and compressed data 142 for the differential image are generated. For ease of understanding, compressed data is equally represented by an image. The compressed data 142 for the differential image is shaded to indicate that the image represents a difference. These items of compressed data are included in a single image block 144. In this example, a combination comprising only the second layer image 34*b* and the third layer image 36*b* are illustrated as being included in the image block 144. Alternatively, images in three or more layers may be similarly included. In other words, the image at the lowest resolution is compressed without any modification, and a high-resolution image is represented by a differential image indicating a difference from an image in the layer immediately above. Alternatively, a plurality of groups of compressed data having such dependency may be included in the image block 144.

The image block 144 thus generated is stored in the hard disk drive 50. The loading unit 108 loads the block 144 into the main memory 60 as necessary. Subsequently, the decoding unit 112 decodes the loaded block in accordance with judgment by, for example, the prefetch processing unit 110. In this process, the compressed data 140 for the second layer image 34*b* is decoded in a normal manner so as to restore the second layer image 34*b* (S28). Meanwhile, the compressed data 142 for the differential image is normally decoded (S30) and blended with the 2×2 enlarged version of the second layer image 34*b* as decoded (S32, S34). Thereby, the third layer image 36*b* is restored.

In the above example, the differential image from an enlarged version of the low-resolution image is used for compression as data for a high-resolution. Conversely, a low-resolution image may be generated by using a high-resolution image. For example, a high-resolution image is subject to wavelet compression and stored in the hard disk drive 50 and loaded into the main memory 60 as needed. The decoding unit 112 may then generate a low-resolution image by generating a low-pass image of the compressed version of the high-resolution image. Similarly, the decoding unit 112 may compress the high-resolution image in the JPEG format and generate a low-resolution image by cutting high-frequency components. Alternatively, a differential image indicating a difference between the low-resolution image thus generated and the original low-resolution image may be compressed and included in the same image block so that the low-resolution image is restored by blending the compressed low-resolution image with the differential image. Still alternatively, a pyramid filter may be used to determine a pixel from a group comprising 2×2 pixels. Using these methods, time required for a load into the main memory 60 is reduced and areas in the main memory 60 are efficiently used.

Figure 18:
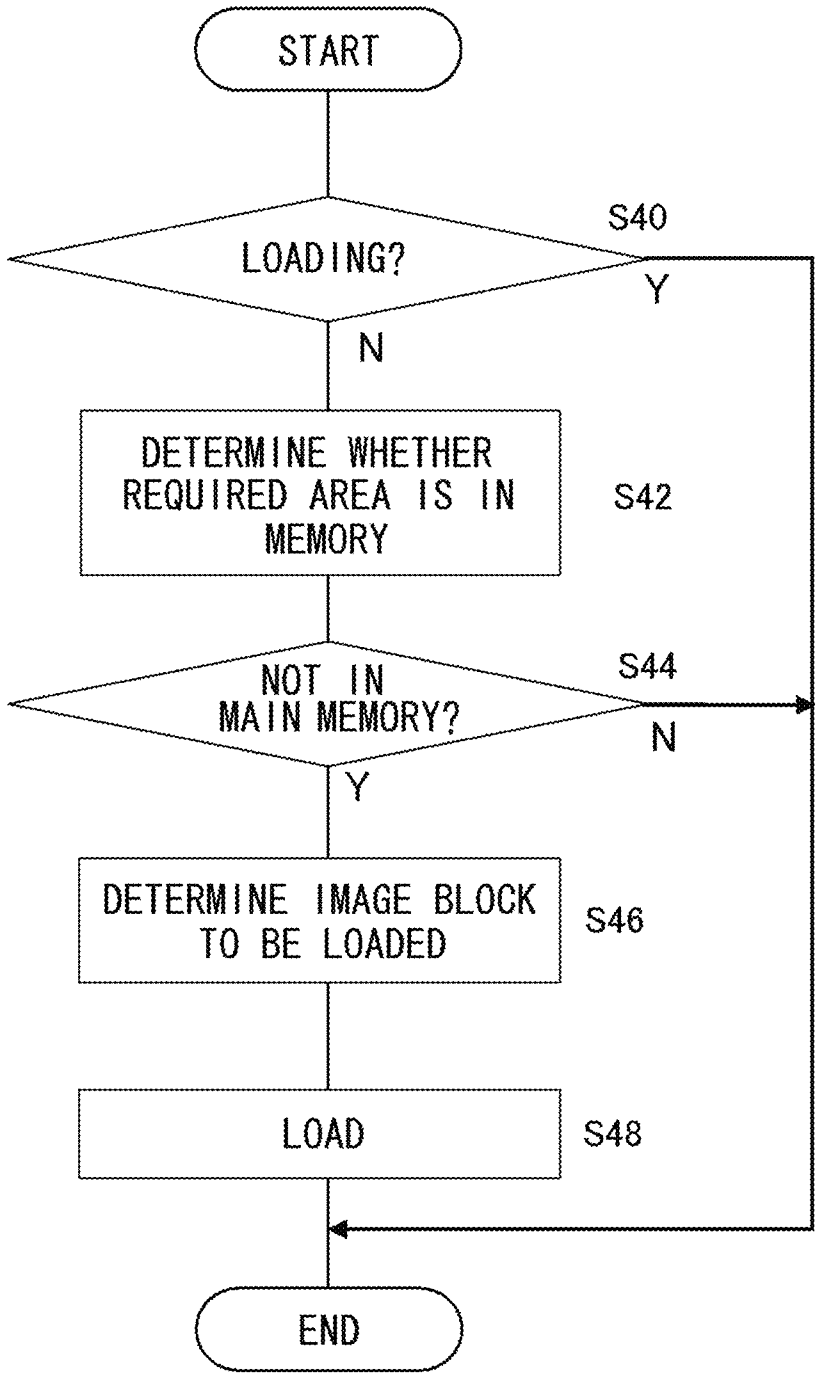
FIG. 18 is a flowchart showing the procedure of determining an image block that should be loaded and loading the block.

A description will now be given of a method of determining an image block that should be loaded into the main memory 60 from image blocks stored in the hard disk drive 50 and loading the block thus determined. FIG. 18 is a flowchart showing the procedure of determining an image block that should be loaded and loading the block. The process is performed at, for example, predefined time periods. The loaded block determination unit 106 verifies whether loading unit 108 is performing a loading process (S40). When a loading process is proceeding, the process of FIG. 18 is terminated (Y in S40).

When a loading process is not proceeding, the unit 106 determines whether the main memory 60 stores data corresponding to an area in the image described later (S42). For this purpose, the main memory 60 stores a table mapping identification information on image blocks stored in the main memory 60, i.e., information comprising the identification number of the start tile image in the block and the number of tile images, into the start address. By searching the table using the identification number of the required tile image, a determination can be made as to whether the main memory 60 contains the required data. The area subject to determination may include a single tile image or a plurality of tile images. The area subject to determination will be referred to as "required area".

If there is an area in the required area that is not loaded into the main memory 60 yet (Y in S44), the image block including that area is identified from the identification number of the tile image included in that area and the identification information on the image block. The image block thus identified is determined as being a target of loading (S46). In the event that a need arises to load a plurality of image blocks, the image block assigned high priority is determined as a target of loading in accordance with a predefined rule. Namely, it is ensured that a large number of image blocks are not loaded in a single loading process.

The larger the number of image blocks loaded at a time, the more time is required to load blocks. When a request to change the displayed image is originated by the user during the loading process, the required area may be changed so that the loading process occurring at that point of time may be wasted. To avoid such a situation, the loaded block determination unit 106 determines an image block that should be loaded on a as-needed basis. It is ensured that one or a predefined number of image blocks or less are loaded at a time.

When the loaded block determination unit 106 determines a target of loading, the loading unit 108 reads the image block that should be loaded from the hard disk drive 50 by referring to a table that maps the identification information of the image block into a storage area, storing the read block in the main memory 60 (S48). When it is determined in S44 that all required areas are stored in the main memory 60, the process is terminated (N in S44).

Figure 19:
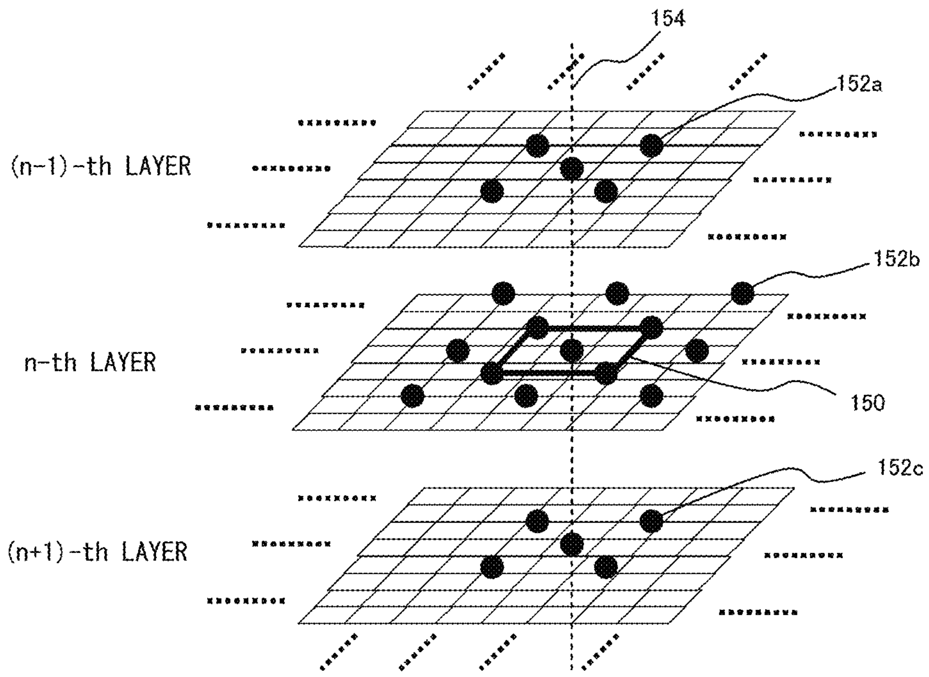
FIG. 19 shows a concept employed for determination of a required area, which is referred to determine whether the required area is stored in the main memory in S42 of FIG. 18.

FIG. 19 shows a concept employed for determination of a required area, which is relied upon to determine whether data for the required area is stored in the main memory 60 in S42. Basically, it is desirable that compressed data for images surrounding the currently displayed area be loaded into the main memory 60. The term "surrounding" may include the neighborhood in the vertical and horizontal directions (X axis and Y axis) in the images in the same layer and in the direction of depth of the hierarchical structure (Z-axis direction). The term "neighborhood in the Z-axis direction" refers to an enlarged image and a reduced image that include the displayed image and the neighborhood thereof.

FIG. 19 shows parts of images in the (n−1)-th layer, n-th layer, and (n+1)-th layer. Tile images are shown in the respective images. The images shown in the respective layers display the same location at a center line 154. If it is provided that an area 150 near the center of the image in the n-th layer is a currently displayed area, the required area will include black dots 152*a*, 152*b*, and 152*c*, for example. Namely, in the image in the n-th layer, i.e., the layer of the displayed image, tile images including the center of the area 150 of the displayed image (intersection with the center line 154) and the four corners and including midpoints of the sides of a rectangle produced by enlarging the area 150 vertically and horizontally and the four corners are defined as forming a required area.

Meanwhile, in the (n−1)-th layer and the (n+1)-th layer adjacent to the displayed image, tile images including the intersection with the center line 154 and the four corners of a rectangle of a predefined size having the intersection as the gravitational center are defined as forming a required area. In this case, the rectangle may have a size commensurate with the size of the rectangle defining the displayed image. By ensuring that an image block including the listed points is loaded into the main memory 60 without exception even if the display area is moved, decoding and rendering of images can proceed smoothly and response to user request to change the image is improved.

The points shown in FIG. 19 are by way of example only. The number of points or the form of arrangement may be varied depending on the image content, the performance of the image processing device 10, or the capacity of the main memory 60. Areas of substantive importance of the image, or areas that are displayed frequently in the past or areas considered to match user preference, which can be determined based on the history of displaying the image for a given user, may be referred to so that may be loaded preferentially regardless of the change in the display area. "Areas of importance" are display areas such as the vicinity of a face in the case of an image of a person, or, in the case of an electronic handbill, products at bargain prices. In the case of an image of newspaper, user preference may be, for example, a column often viewed by the user. It is ensured that such areas are loaded with high priority even if a need arises to load a plurality of image blocks in S46 of FIG. 18. Alternatively, the areas may be loaded when the display of an image is started.

As regards the priority in S46 of FIG. 18, the following additional rules may be used for example. According to the first rule, image blocks of images in a different layer, i.e., an enlarged image and a reduced image may be loaded with higher priority than image blocks in the same layer as the displayed image. This is because, in the case of the movement of a display area within the same layer, the likelihood is high that the decoded images stored in the two buffer areas 72 and 74 in the buffer memory 70 can cover the movement, while the likelihood is high that the movement across layers requires updating the decoded images in the buffer memory 70 in their entirety. Reciprocating movement between two layers, however, may only require the buffer memory 70.

The second rule is that image blocks in a higher layer, i.e., image blocks of reduced images, are given higher priority than image blocks in a lower layer, i.e., image blocks of enlarged images. Even if the loading or decoding of an enlarged image cannot take place in time, tentative measures can be taken by enlarging a reduced image, but the opposite is difficult.

Figure 20:
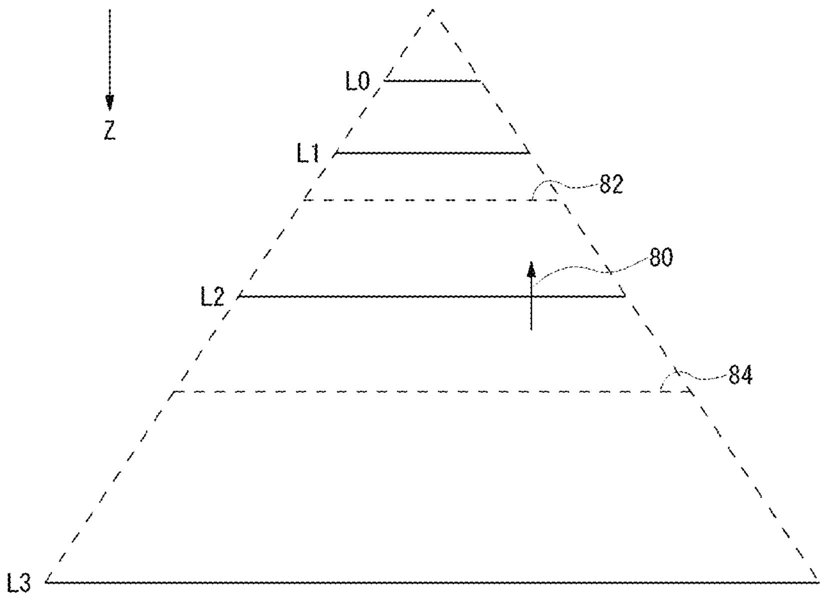
FIG. 20 shows a prefetch process performed by the prefetch processing unit according to the embodiment.

FIG. 20 shows a prefetch process performed by the prefetch processing unit 110. FIG. 20 shows the structure of hierarchical data. The layers are represented as L0 (O-th layer), L1 (first layer), L2 (second layer), and L3 (third layer), respectively. An arrow 80 indicates that user request to change the image is a request to reduce the displayed image and shows that reduction occurs across the layers L2 and L1. In the image processing device 10 according to the embodiment, the position of L1, L2, where the original image data is located, in the direction of depth as the boundary of prefetching. When the request to change the image from the input device 20 exceeds the prefetch boundary, the prefetch process is started.

When the scale of the displayed image is close to L2, the displayed image is generated by using the image in L2 (second layer). More specifically, when the scale of the image displayed is between a switching boundary 82 and a switching boundary 84, the image in L2 is enlarged or reduced to generate the displayed image, the boundary 82 being between the image in L1 and the image in L2, and the boundary 84 being between the image in L2 and the image in L3. Therefore, when reduction of an image is requested as indicated by an arrow 80, the enlarged version of the image in L2 is turned into a reduced version and displayed. The image processing device 10 according to the embodiment is configured to identify the image predicted to be necessary in the future by referring to the request to change the image, reads the identified image from the main memory 60, and decodes the read image. In the example of FIG. 20, when the scale requested by the request to change the image exceeds L2, the image in L1 located in the direction of reduction is read from the main memory 60, decoded, and written in the buffer memory 70.

Prefetching in the upward, downward, leftward, or rightward direction in the identical layer is also processed in a similar manner. More specifically, the prefetch boundary is set in the image data stored in the buffer memory 70 so that, when the display position indicated by the request to change the image exceeds the prefetch boundary, the prefetch process is started.

Figure 21:
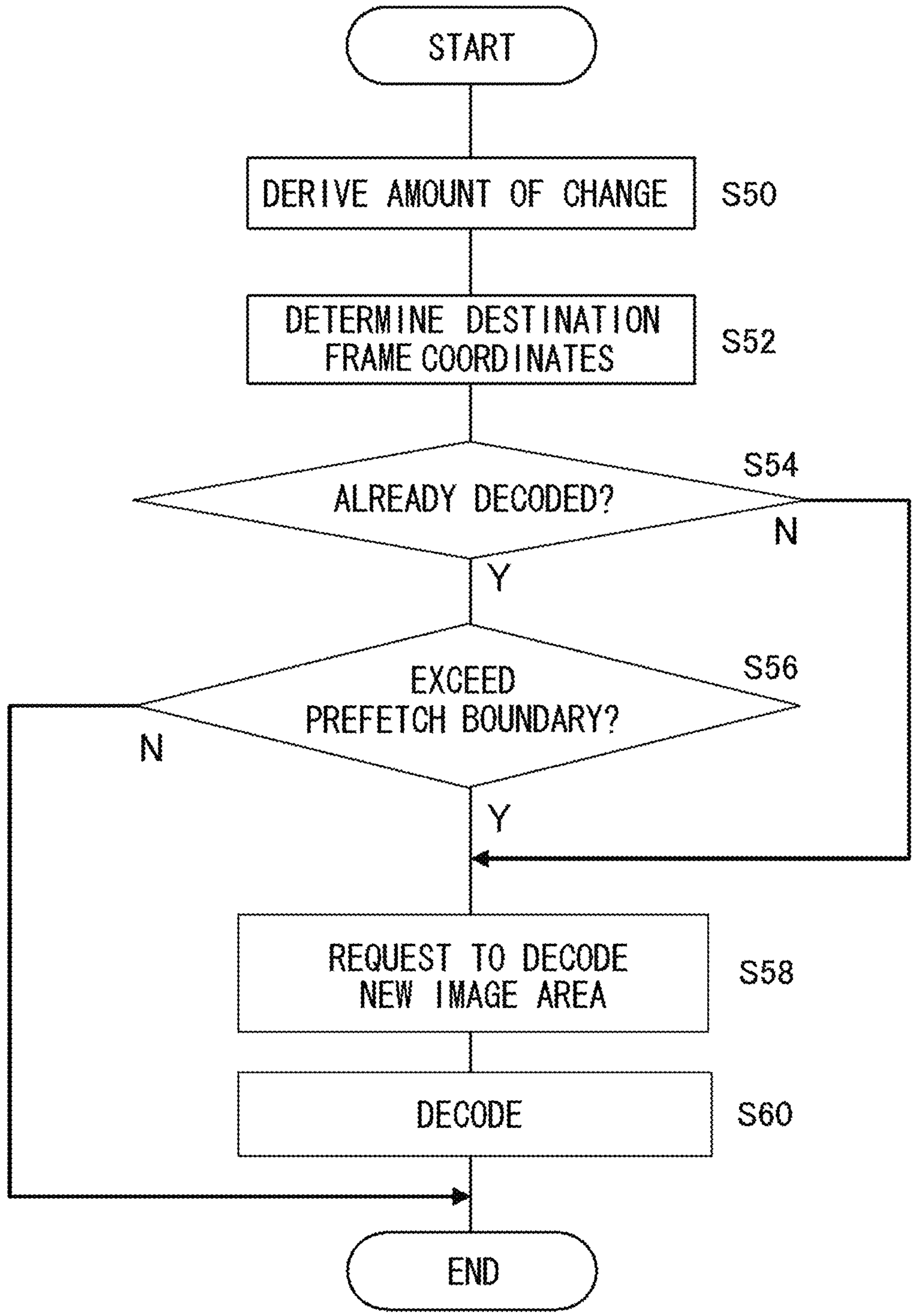
FIG. 21 is a flowchart showing the procedure of decoding the image using the prefetch processing unit and the decoding unit according to the embodiment.

FIG. 21 is a flowchart showing the procedure of decoding the image using the prefetch processing unit 110 and the decoding unit 112. The requested amount of change in the displayed image is derived based on the signal requesting change in an image from the input device 20 (S50). The amount of change in the displayed image is the amount of movement in the upward, downward, leftward, or rightward direction, and the amount of movement in the depth direction. Subsequently, the frame coordinates of the four corners of the pre-movement display area in the hierarchical structure are referred to so as to determine the frame coordinates of the four corners of the display area at the destination of movement, using the amount of change derived (S52).

A determination is then made as to whether the image area for displaying the area identified by the frame coordinates thus determined is already decoded and stored in the buffer area 72 or the buffer area 74 of the buffer memory 70 (S54). When the necessary image area is located in the buffer area 72 or the buffer area 74 (Y in S54), a determination is made as to whether the requested scale exceeds the prefetch boundary (S56). When the prefetch boundary is not crossed, the buffer memory 70 remains unchanged and the process is terminated.

When the image area that allows displaying of the area identified by the frame coordinates of the four corners determined in S52 is not located in the buffer memory 70 (N in S54), or when the requested scale exceeds the prefetch boundary (Y in S56), the prefetch boundary 110 requests the decoding unit 112 to decode the necessary image area. The decoding unit 112 acquires data for the designated image area from the main memory 60, decodes the acquired data, and stores the data in the buffer area 72 or the buffer area 74 (S60). This allows the necessary image area to be loaded into the buffer memory 70 before the displayed image processing unit 114 generates the displayed image.

When part of the image stored in the display buffer is displayed and given that the movement takes place in the same layer, the image that will be needed in the decoding buffer will be, for example, an image that includes the display area in the image's end toward the source of movement when the display area stretches across the prefetch boundary. In this case, the image stored in the buffer area 72 and the buffer area 74 has an overlapping area at least having the size of the displayed image. The area of overlapping will be increased depending on the position where the prefetch boundary is set. The range of image that should be decoded anew when the prefetch boundary is crossed may be preset depending on the processing speed, etc. Alternatively, the range may be varied depending on the image content.

By using the decoding buffer as described above, the image stored anew may partly overlap the image stored so far in the decoding buffer. The property may be exploited according to the embodiment to reduce areas decoded anew and reduce the load required for decoding, using the process as described below.

Figure 22:
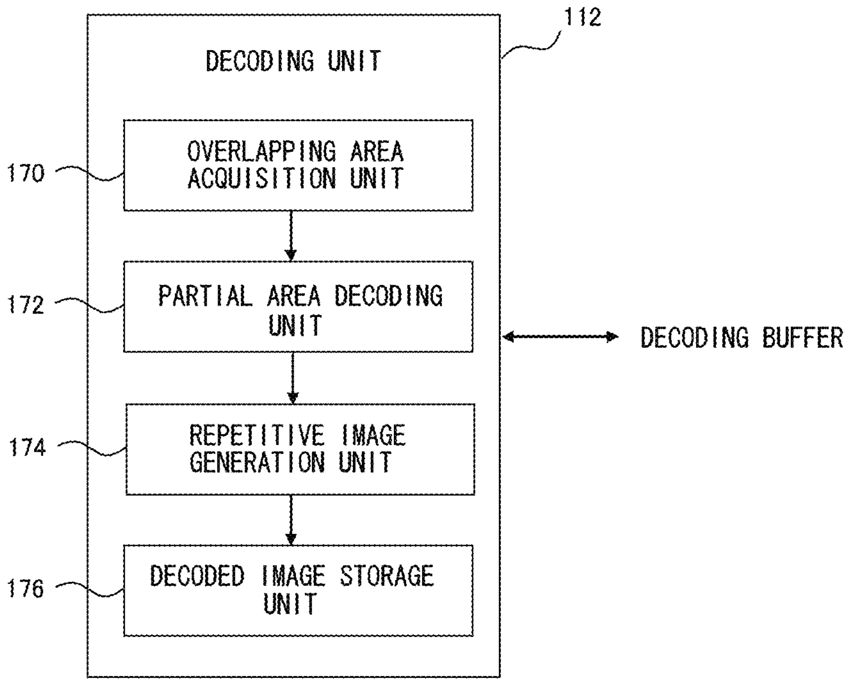
FIG. 22 shows functional blocks of the decoding unit when the image that should be stored anew in the decoding buffer of the buffer memory partly overlaps the image already stored according to the embodiment.

FIG. 22 shows functional blocks of the decoding unit 112 when the image that should be stored anew in the decoding buffer of the buffer memory 70 partly overlaps the image already stored. The decoding unit 112 comprises an overlapping area acquisition unit 170 configured to identify an area of overlapping, a partial area decoding unit 172 configured to decode a non-overlapping area anew and overwrite part of the image already stored, a repetitive image generation unit 174 configured to generate an image in which overwritten image is arranged repeatedly, and a decoding image storage unit 176 configured to extract part of the images arranged and store the extracted image in the decoding buffer as the ultimate decoded image.

Figure 23:
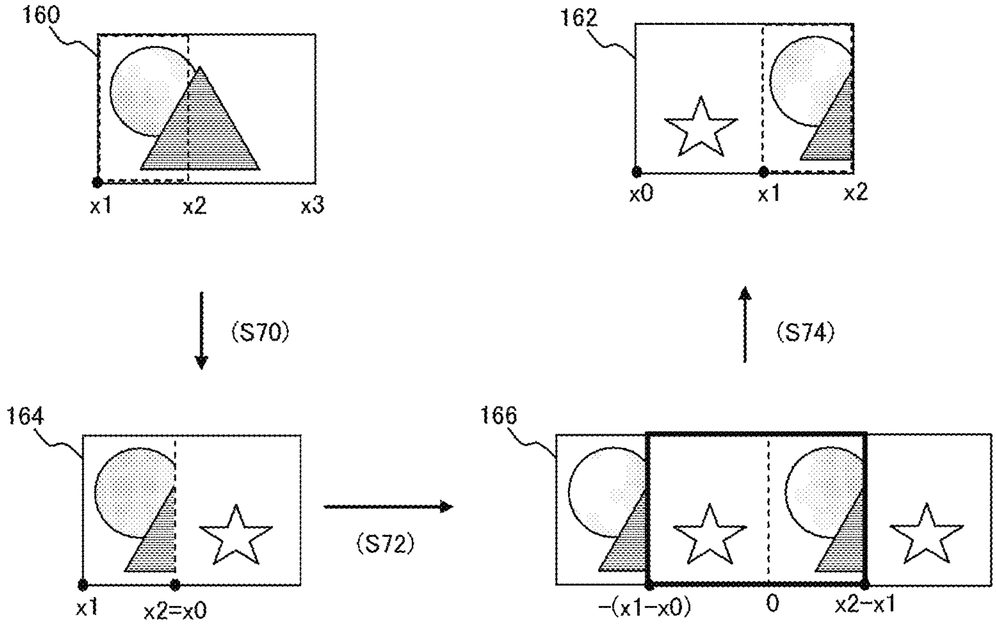
FIG. 23 schematically shows the procedure whereby the decoding unit of FIG. 22 stores the image in the decoding buffer.

FIG. 23 schematically shows the procedure whereby the decoding unit 112 of FIG. 22 stores the image in the decoding buffer. As described above, the decoding buffer should store a new image in the decoding buffer when, for example, the display area extends beyond the prefetch boundary in the image stored in the display buffer. It will be assumed that an image 160 at top left in the figure is that which has been already stored in the decoding buffer at this point of time. Meanwhile, an image 162 at top right should be stored anew. In other words, the figure shows that the display area moves left, indicating that the "star" graphic toward the left is likely to be displayed next in place of the "circle" and "triangle" graphics as originally displayed.

For the reason described above, the images 160 and 162 have overlapping areas. In the illustrated example, an area between x1 and x2 of the image 162, which comprises an area between x0 and x2 in the horizontal direction (X axis), overlaps the image 160. In such a case, the area between x1 and x2 of the image 160 already stored is used as part of the image that should be stored anew.

More specifically, the partial area decoding unit 172 decodes only the area between x0 and x1 of the image 162 that should be stored anew not overlapping the image 160, and overwrites an area between x2 and x3 of the image 160 already stored that is no longer necessary (S70). There may be cases, however, where it is not possible to decode only the non-overlapping area between x0 and x1, depending on the arrangement of units of compression, e.g., when compression takes place in units of tile images. In this case, the minimum area including the relevant area and subject to decoding is decoded and then only the area between x0 and x1 is extracted to overwrite the area between x2 and x3.

To perform the process of S70, the buffer areas 72 and 74 of the buffer memory 70 are provided with areas for storing the bottom left coordinates of the currently stored image. The overlapping area acquisition unit 170 identifies an area of overlapping by comparing the buffer's bottom left coordinates with the bottom left coordinates of the area that should stored anew. When the load of certain level or higher is imposed in order to identify an area of overlapping, the image 162 that should be stored anew may be decoded in its entirety so that only the non-overlapping area is overwritten.

Subsequently, the repetitive image generation unit 174 temporarily generates a repetitive image 166 in which a resultant intermediate image 164 is repeated in the horizontal direction (S72). An image in which a unit image is repeated vertically or horizontally can be generated by a technology ordinarily available in image processing. Given that the coordinate of the boundary in the intermediate image forming the repetitive image 166 is 0, the decoded image storage unit 176 extracts the area between −(x1−x0) and x2−x1 and stores the extracted data in the decoding buffer anew (S74). As a result, the image 162 that should be stored anew is stored in the decoding buffer. The illustrated example focuses on movement only in the horizontal direction. Movement only in the vertical direction, or movement in both horizontal and vertical directions may similarly be processed to decode only the area other than the overlapping area. It should be noted that, in the case of movement in both horizontal and vertical directions, the repetitive image 166 is an image in which the intermediate images 164 are repeated twice in the vertical and horizontal directions.

With these measures, the prefetched area can be stored in the decoding buffer merely by performing minimum amount of decoding. Therefore, latency in image display due to the decoding process is reduced. In one variation, the intermediate image 164 may be stored in the decoding buffer. In this case, the displayed image processing unit 114 reads the intermediate image 164 from the decoding buffer in accordance with user control, performs the process of S72 and S74, and renders the image 162 that should be stored anew in the frame memory 90 of the display processing unit 44.

Described above is a method of decoding in the prefetch process initiated by the movement of the display area in the identical layer. The user request may be to enlarge or reduce the image without changing the central point being displayed. If the change is requested only in one direction (i.e., enlargement or reduction), the new image will be stored in a decoding buffer when the prefetch boundary is crossed. If a request is made to return to the original scale without crossing either of the two prefetch boundaries, there is no need to store a new image in decoding buffer and the image already stored can be used as it is.

In this respect, the buffer areas 72 and 74 of the buffer memory 70 may additionally be provided with an area for storing the layer number of the currently stored image. If the layer that should be stored in the decoding buffer and the layer already stored are identical when the prefetch boundary set in the depth direction of the layers is exceeded, the decoding process is not performed and the image already stored is maintained. This ensures that the number of decoding processes performed to enlarge or reduce the displayed image is minimum so that the processing load and latency are reduced.

According to the embodiment described above, an image processing device for displaying at least part of a compressed image upon user request is configured to load part of data from a hard disk drive for storing compressed data into a main memory. By decoding the data loaded into the main memory and displaying the data accordingly, time required to read necessary data from the hard disk drive in response to a user request to change a displayed image is saved so that response is improved. By loading only part of the data, an image of a size that exceeds the capacity of the main memory can be displayed, i.e., constraints with respect to the image subject to display are reduced.

Further, the image data is divided into blocks of substantially the same size and stored in the hard disk drive so that the data is loaded into the main memory in units of blocks. This prevents fragmentation from occurring when loading a new block even when loaded blocks are stored in continuous areas in the main memory, with the result that the main memory is used efficiently and address management is facilitated.

In dividing the image data into blocks, it is ensured that information contained in each block is spatially localized. More specifically, tile images included in a block are appended such that a starting tile image is extended equally in the horizontal and vertical directions. By defining the area of the block immediately before a predefined data size is reached, it is ensured that the block has a substantially square shape. Alternatively, a block may have a substantially rectangular shape having a predefined width by appending tile images in the order of rastering within a predefined partition of square or strip shape. This reduces the number of blocks necessary for display and number of loading processes. Also, the operation of reading data required for decoding from the main memory is facilitated. For a similar reason, the boundaries between blocks may present T-shaped intersections.

Blocks may be loaded into the main memory other than when the displayed image is changed. For example, blocks may be loaded at predefined intervals. In this process, points included in areas positionally or hierarchically surrounding the currently displayed image are determined according to a predefined rule. Those of blocks including the points and not loaded yet are loaded as the need arises. Further, areas that are important in terms of their content or areas that are predicted, based on user-based history of display, to be displayed with higher probability than a predefined threshold value are loaded with high priority. This reduces the likelihood of having to load data from the hard disk drive or download the data from the network suddenly upon request from the user to change the displayed image. Further, there will be no need to load a large number of blocks at a time so that latency due to the loading process is reduced.

The image is divided into blocks such that those portions of images in different layers that represent the same area are included in the same block. In this process, redundancy between images is exploited so that information necessary to restore an image and retained by another image is not contained in the block in a redundant manner. For example, a low-resolution image, and a differential image between an enlarged version of the low-resolution image and a high-resolution image may be included in a given block and compressed. In this way, the high-resolution image can be restored. According to the embodiment, the image is loaded into the main memory in units of blocks so that redundancy between images can be exploited. With these measures, data compression ratio is improved and the main memory can be used efficiently.

Further, two buffers, namely a display buffer and a decoding buffer, are made available as buffer areas for storing decoded images so that areas predicted to be displayed in the future are decoded and stored in the decoding buffer. In this case, when a new image should be stored in the decoding buffer, an area overlapping the image already stored is used as it is. More specifically, an intermediate image is generated in which a non-overlapping area in the image already stored is overwritten by an area in the new image, and a repetitive image is created to include a repetition of the intermediate images. By extracting a necessary portion from the repetitive image, decoding processes are minimized and new images are stored easily.

By configuring the buffer as described above, the processing load in the event of movement of the display area in the identical layer is reduced. Thereby, it is easy to maintain response to user request to change the display image at a certain level or higher. Therefore, by loading data in a layer different from the layer of the displayed image into the main memory with high priority, overall response is further improved, coupled with the use of buffer memories. These embodiments are implemented without making device configuration complex or requiring a large size.

Described above is an explanation based on an exemplary embodiment. The embodiment is intended to be illustrative only and it will be obvious to those skilled in the art that various modifications to constituting elements and processes could be developed and that such modifications are also within the scope of the present invention.

INDUSTRIAL APPLICABILITY

As described above, the present invention is applicable to information processing devices such as image processing devices, image display devices, computers, game devices, etc.

DESCRIPTION OF THE REFERENCE NUMERALS

1 image processing system, 10 image processing device, 12 display device, 20 input device, 30 0-th layer, 32 first layer, 34 second layer, 36 third layer, 38 tile image, 44 display processing unit, 50 hard disk drive, 60 main memory, 70 buffer memory, 72 buffer area, 74 buffer area, 90 frame memory, 100 control unit, 102 input information acquisition unit, 104 compressed data division unit, 106 loaded block determination unit, 108 loading unit, 110 prefetch processing unit, 112 decoding unit, 114 displayed image processing unit, 120 identification number assigning unit, 122 image block generation unit, 170 overlapping area acquisition unit, 172 partial area decoding unit, 174 repetitive image generation unit, 176 decoded image storage unit

The invention claimed is:

1. An image processing device adapted to display at least part of an image on a display, comprising:

a compressed data division unit configured to generate a plurality of M image blocks by dividing a compressed version of the image according to a predefined rule prior to displaying the at least part of the image on the display, wherein: (i) the compressed version of the image includes a plurality of N tile images, each tile image being a minimum unit of compression of the image, each tile image representing a fixed area size of the image, and each tile image being of a respective and variable byte size that is smaller than a maximum byte size limit for each of the plurality of image blocks, and (ii) each of the plurality of image blocks includes a respective and variable number of the plurality of N tile images, where the respective number of tile images within each image block is maximized such that an attempt to add an additional tile image to a given image block would exceed the maximum byte size limit, a respective byte size of each image block is equal to a sum of the respective byte sizes of the tile images within each image block and is less than or equal to the maximum byte size limit, and the respective byte sizes of the plurality of image blocks are not fixed;

a storage device configured to store the plurality of image blocks;

a loading unit configured to load, from the storage device into a memory, an image block that includes data for a required area, determined according to a predefined rule from an area of the image; and a displayed image processing unit configured to read, in accordance with a user request requesting movement, enlargement, or reduction of a display area, at least part of the image block loaded by the loading unit from the memory, to decode the read block, and to generate a new displayed image.

2. The image processing device according to claim 1, wherein the storage device stores the image blocks produced by dividing compressed data for images of a plurality of resolutions forming the image.

3. The image processing device according to claim 2, wherein the loading unit defines, as said required area, at least one of: i) an area within a predefined range from an area being displayed, and ii) an area in an enlarged image or a reduced image of the image being displayed at a predefined scale and including the area being displayed.

4. The image processing device according to claim 1, wherein the compressed data division unit comprises:

an identification number assigning unit configured to assign a plurality of identification numbers respectively to the plurality of tile images forming the image in the order of rastering; and an image block generation unit configured to collect compressed data for the plurality of tile images in order of identification number assigned by the identification number assigning unit so as to produce the image blocks.

5. The image processing device according to claim 1, wherein the compressed data division unit comprises:

an identification number assigning unit configured to assign respectively a plurality of identification numbers to the plurality of tile images forming the image, alternately increasing a number in a horizontal direction and in a vertical direction; and an image block generation unit configured to collect compressed data for the plurality of tile images in order of identification number assigned by the identification number assigning unit so as to produce the image blocks.

6. The image processing device according to claim 1, wherein the compressed data division unit comprises:

an identification number assigning unit configured to assign respectively a plurality of identification numbers to the plurality of tile images in the order of rastering inside each macrotile targeted in the order of rastering in the image, a macrotile being produced by partitioning an array of the plurality of tile images that form the image at predefined intervals; and an image block generation unit configured to collect compressed data for the plurality of tile images in order of identification number assigned by the identification number assigning unit so as to produce the image blocks.

7. The image processing device according to claim 1, wherein the compressed data division unit generates the image blocks so that at least some boundaries between image blocks on the image present T-shaped intersections.

8. The image processing device according to claim 1, further comprising:

a loaded block determination unit configured to determine, at predetermined time intervals, whether an image block that includes data for the required area is entirely stored in the memory, and to request the loading unit to load an image block that is not stored in memory, wherein the loading unit loads the image block in accordance with a request from the loaded block determination unit.

9. The image processing device according to claim 1, wherein the loading unit loads, in addition to the required area, an image block that includes data for a predefined area in an image, or an area that is predicted, based on a user-based history of display, to be displayed with a higher probability than a predefined threshold value.

10. The image processing device according to claim 1, wherein the storage device stores the plurality of image blocks, each image block including compressed data for images of a plurality of resolutions representing a common area in the image.

11. The image processing device according to claim 1, wherein:

given the images of two resolutions of the image representing a common area, the storage device stores the plurality of image blocks, each image block including compressed data for a low-resolution image and a difference image, indicating a difference between an enlarged version of the low-resolution image and a high-resolution image, and the displayed image processing unit decodes the high-resolution image by decoding the low-resolution image and the difference image and by blending the decoded images.

12. The image processing device according to claim 1, wherein the displayed image processing unit comprises:

a decoding unit configured to read at least part of an image block from the memory and decode the read block;

a buffer memory configured to store image data for the area of the image to be displayed that has been decoded by the decoding unit; and a rendering unit configured to read at least part of the image data stored in the buffer memory and to render the area of the image to be displayed, wherein the decoding unit comprises:

an overlapping area acquisition unit configured, when new image data is to be stored in the buffer memory, to identify an area of overlap between the image data already stored in the buffer memory and the new image data;

a partial area decoding unit configured to decode compressed image data for a partial area in the new image data that is not in the area of overlap, and to produce intermediate image data by overwriting the image data already stored in the buffer memory that is not in the area of overlap with the partial area of the new image data;

a repetitive image generation unit configured to generate a repetitive image by repeating the intermediate image data in the buffer memory; and a decoded image storage unit configured to extract an area of the repetitive image so as to concatenate the area of overlap in the image data already stored with the partial area and to store the concatenated image in the buffer memory.

13. An image processing method adapted to display at least part of an image on a display, comprising:

producing a plurality of M image blocks by dividing a compressed version of the image according to a predefined rule prior to displaying the at least part of the image on the display, wherein: (i) the compressed version of the image includes a plurality of N tile images, each tile image being a minimum unit of compression of the image, each tile image representing a fixed area size of the image, and each tile image being of a respective and variable byte size that is smaller than a maximum byte size limit for each of the plurality of image blocks, and (ii) each of the plurality of image blocks includes a respective and variable number of the plurality of N tile images, where the respective number of tile images within each image block is maximized such that an attempt to add an additional tile image to a given image block would exceed the maximum byte size limit, a respective byte size of each image block is equal to a sum of the respective byte sizes of the tile images within each image block and is less than or equal to the maximum byte size limit, and the respective byte sizes of the plurality of image blocks are not fixed;

loading, from the storage device into a memory, an image block that includes data for a required area, determined according to a predefined rule from an area of the image; and reading, in accordance with a user request requesting movement, enlargement, or reduction of a display area, at least part of the loaded image block from the memory, decoding the read block, and generating a new displayed image.

14. The image processing method according to claim 13, wherein said storing includes, in a single image block, compressed data for images of different resolutions representing the same area.

15. A non-transitory computer-readable recording medium with a computer program embedded thereon, the computer program adapted to display at least part of an image on a display and comprising:

a module configured to produce a plurality of M image blocks by dividing a compressed version of the image according to a predefined rule prior to displaying the at least part of the image on the display, wherein: (i) the compressed version of the image includes a plurality of N tile images, each tile image being a minimum unit of compression of the image, each tile image representing a fixed area size of the image, and each tile image being of a respective and variable byte size that is smaller than a maximum byte size limit for each of the plurality of image blocks, and (ii) each of the plurality of image blocks includes a respective and variable number of the plurality of N tile images, where the respective number of tile images within each image block is maximized such that an attempt to add an additional tile image to a given image block would exceed the maximum byte size limit, a respective byte size of each image block is equal to a sum of the respective byte sizes of the tile images within each image block and is less than or equal to the maximum byte size limit, and the respective byte sizes of the plurality of image blocks are not fixed;

a module configured to load, from the storage device into a memory, an image block that includes data for a required area, determined according to a predefined rule from the image; and a module configured to read, in accordance with a user request requesting movement, enlargement, or reduction of a display area, at least part of the loaded image block from the memory, decoding the read block, and generating a new displayed image.

16. An image processing device adapted to display an area in an image on a display according to a user request, comprising:

a decoding unit configured to refer to the user request and read compressed image data for a required area from a memory and to decode the read image data;

a buffer memory configured to store image data for the area of the image to be displayed that has been decoded by the decoding unit; and a rendering unit configured to read at least part of the image data stored in the buffer memory and to render the area of the image to be displayed, wherein the decoding unit comprises:

an overlapping area acquisition unit configured, when new image data is to be stored in the buffer memory, to identify an area of overlap between the image data already stored in the buffer memory and the new image data;

a partial area decoding unit configured to decode compressed image data for a partial area in the new image data that is not in the area of overlap, and to produce intermediate image data by overwriting the image data already stored in the buffer memory that is not in the area of overlap with the partial area of the new image data;

a repetitive image generation unit configured to generate a repetitive image by repeating the intermediate image data in the buffer memory in a series such that two copies of the intermediate image data are disposed adjacent to one another along an edge; and a decoded image storage unit configured to extract an area of the repetitive image so as to concatenate the area of overlap in the image data already stored with the partial area and to store the concatenated image in the buffer memory, wherein the extracted area of the repetitive image includes the edge and respective portions of the repetitive image on each side of the edge.

17. The image processing device according to claim 16, wherein:

the buffer memory comprises a display buffer area configured to store an image for rendering a currently displayed area, and a decoding buffer configured to store a decoded image that is predicted, based upon the request, to be needed subsequent to the image stored in the display buffer, and the decoded image storage unit concatenates the area of overlap in the image stored in the decoding buffer with the partial area, and stores the concatenated image in the decoding buffer.

18. An image processing method adapted to display an area in an image on a display according to a user request, comprising:

identifying, when decoding compressed image data for a required area based upon a user request and storing new image data thus decoded in a buffer memory, an area of overlap between image data already stored in the buffer memory and the new image data to be stored in the buffer memory;

reading, from the main memory, compressed image data for an area in the new image data including a partial area that is not in the area of overlap, decoding the read data, generating intermediate image data by overwriting the image data already stored in the buffer memory that is not in the area of overlap with the partial area of the new image data;

generating a repetitive image by repeating the intermediate image data in the buffer memory in a series such that two copies of the intermediate image data are disposed adjacent to one another along an edge;

extracting an area of the repetitive image so as to concatenate the area of overlap in the image data already stored with the partial area, and storing the concatenated image in the buffer memory, wherein the extracted area of the repetitive image includes the edge and respective portions of the repetitive image on each side of the edge; and reading at least part of the image stored in the buffer memory and rendering an area that should be displayed.

19. A non-transitory computer-readable medium with a computer program embedded thereon adapted to display an area in an image on a display according to a user request, the computer program comprising:

a module configured to identify, when decoding compressed image data for a required area based upon a user request and storing new image data thus decoded in a buffer memory, an area of overlap between image data already stored in the buffer memory and the new image data to be stored in the buffer memory;

a module configured to read, from the main memory, compressed image data for an area in the new image data including a partial area that is not in the area of overlap, decode the read data, a module configured to generate intermediate image data by overwriting the image data already stored in the buffer memory that is not in the area of overlap with the partial area of the new image data;

a module configured to generate a repetitive image by repeating the intermediate image data in the buffer memory in a series such that two copies of the intermediate image data are disposed adjacent to one another along an edge;

a module configured to extract an area of the repetitive image so as to concatenate the area of overlap in the image data already stored with the partial area, and storing the concatenated image in the buffer memory, wherein the extracted area of the repetitive image includes the edge and respective portions of the repetitive image on each side of the edge; and a module configured to read at least part of the image stored in the buffer memory and rendering an area that should be displayed.

* * * * *